(12) United States Patent
Boroson et al.

(10) Patent No.: US 11,522,607 B2
(45) Date of Patent: Dec. 6, 2022

(54) FREE-SPACE OPTICAL COMMUNICATION SYSTEM AND METHODS FOR EFFICIENT DATA DELIVERY

(71) Applicant: Massachusetts Institute of Technology, Cambridge, MA (US)

(72) Inventors: Don M. Boroson, Needham, MA (US); Bryan S. Robinson, Arlington, MA (US); Jade Wang, Arlington, MA (US); Kathleen M. Riesing, Cambridge, MA (US); Jamie W. Burnside, Lexington, MA (US); Curt Schieler, Acton, MA (US); Bryan C. Bilyeu, Wilmington, MA (US); Jessica Chang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/578,702

(22) Filed: Jan. 19, 2022

(65) Prior Publication Data
US 2022/0303009 A1 Sep. 22, 2022

Related U.S. Application Data

(60) Provisional application No. 63/163,501, filed on Mar. 19, 2021.

(51) Int. Cl.
*H04B 10/112* (2013.01)
*H04L 1/18* (2006.01)

(52) U.S. Cl.
CPC ..... *H04B 10/1127* (2013.01); *H04B 10/1129* (2013.01); *H04L 1/18* (2013.01)

(58) Field of Classification Search
None
See application file for complete search history.

(56) References Cited

U.S. PATENT DOCUMENTS

| 10,142,030 B1 * | 11/2018 | Blanks ............... H04L 27/1563 |
| 2006/0222290 A1 * | 10/2006 | Yamashita ........... G02B 6/3586 385/18 |
| 2014/0226977 A1 * | 8/2014 | Jovicic ..................... H04B 3/46 398/115 |
| 2014/0293646 A1 * | 10/2014 | Iwazaki .................... F21S 4/28 362/609 |
| 2017/0207850 A1 * | 7/2017 | Takahashi .............. H04B 10/60 |
| 2017/0264365 A1 * | 9/2017 | Takahashi ............ H04B 10/548 |

OTHER PUBLICATIONS

Barron et al. "Analysis of capacity and probability of outage for free-space optical channels with fading due to pointing and tracking error." Free-Space Laser Communication Technologies XVIII. vol. 6105. SPIE, 2006, 13 pages.

(Continued)

*Primary Examiner* — Darren E Wolf
(74) *Attorney, Agent, or Firm* — Smith Baluch LLP

(57) ABSTRACT

Communication systems and methods for high-data-rate, high-efficiency, free-space communications are described. High-speed optical modems and automatic repeat request can be employed to transmit large data files without data errors between remote devices, such as an earth-orbiting satellite and ground station. Data rates over 100 Gb/s can be achieved.

20 Claims, 10 Drawing Sheets

(56) References Cited

OTHER PUBLICATIONS

Boroson "Channel capacity limits for free-space optical links." Atmospheric Propagation V. vol. 6951. SPIE, 2008, 12 pages.

Chang et al. "Body pointing, acquisition and tracking for small satellite laser communication." Free-Space Laser Communications XXXI. vol. 10910. SPIE, 2019, 10 pages.

Robinson et al., "TeraByte InfraRed Delivery (TBIRD): a demonstration of large-volume direct-to-Earth data transfer from low-Earth orbit." Free-Space Laser Communication and Atmospheric Propagation XXX. vol. 10524. International Society for Optics and Photonics, 2018. 7 pages.

Schieler et al., "Data delivery performance of space-to-ground optical communication systems employing rate-constrained feedback protocols." Free-Space Laser Communication and Atmospheric Propagation XXIX. vol. 10096. International Society for Optics and Photonics, 2017. 9 pages.

Schieler et al., "Data volume analysis of a 100+ GB/s LEO-to-ground optical link with ARQ." Free-Space Laser Communication and Atmospheric Propagation XXX. vol. 10524. International Society for Optics and Photonics, 2018. 8 pages.

Schieler et al., "Demonstration of reliable high-rate optical communication over an atmospheric link using ARQ." 2019 IEEE International Conference on Space Optical Systems and Applications (ICSOS). IEEE, 2019 pp. 1-6, doi: 10.1109/ICSOS45490.2019.8978989.

\* cited by examiner

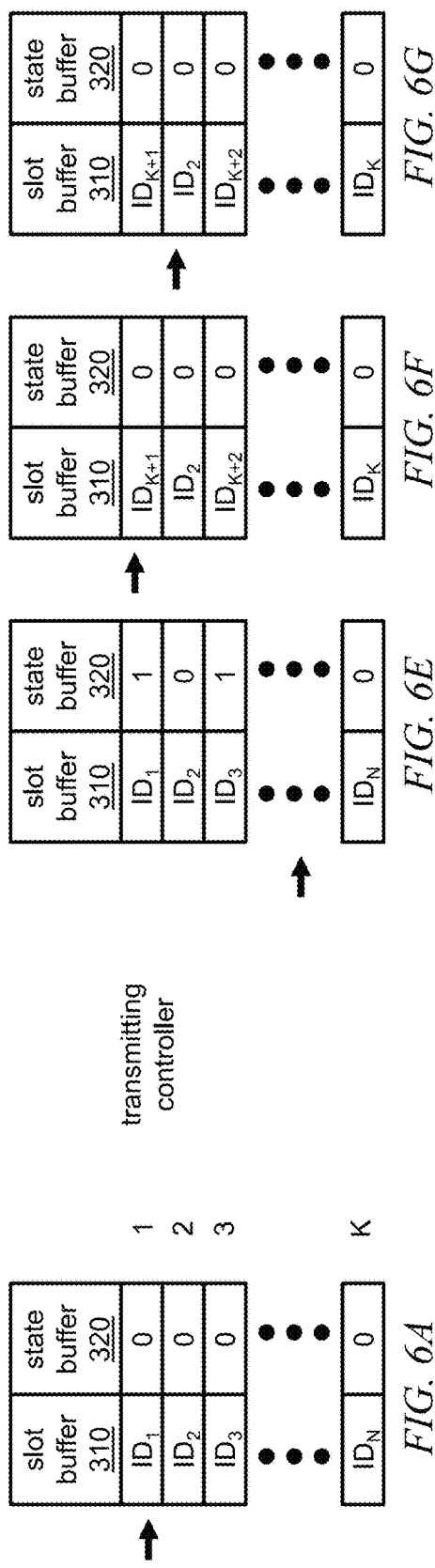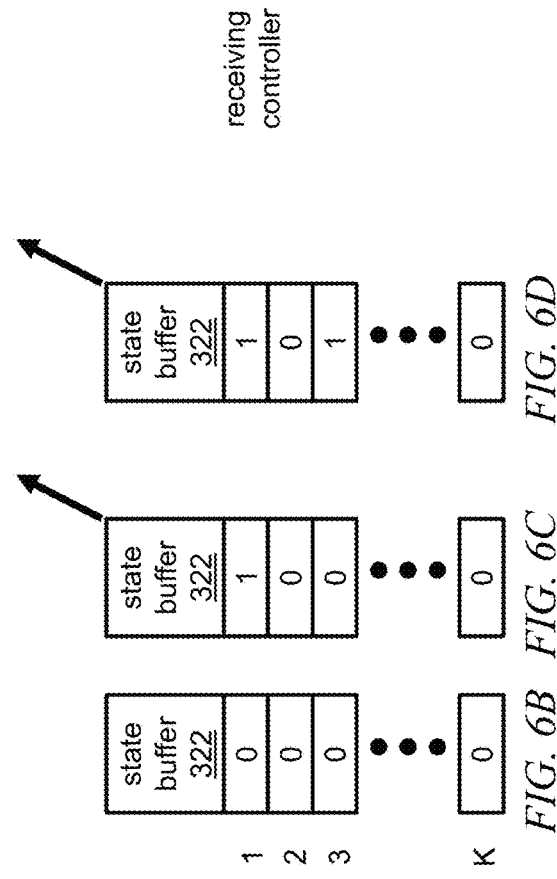

FREE-SPACE OPTICAL COMMUNICATION SYSTEM AND METHODS FOR EFFICIENT DATA DELIVERY

CROSS-REFERENCE TO RELATED APPLICATION

The present application claims a priority benefit, under 35 U.S.C. § 119(e), to U.S. provisional application Ser. No. 63/163,501 filed on Mar. 19, 2021, titled "Free-Space Optical Communication System and Methods for Efficient Data Delivery," which application is incorporated herein by reference in its entirety.

GOVERNMENT SUPPORT

This invention was made with Government support under Grant No. FA8702-15-D-0001 awarded by the National Aeronautics and Space Administration. The Government has certain rights in the invention.

BACKGROUND

Earth-orbiting satellites have become more numerous and more technically advanced with state-of-the art monitoring equipment. Global positioning satellites may be distributed around the globe and linked in a communication network. Remote sensing satellites may include higher-resolution imaging apparatus and acquire larger amounts of imaging and/or sensing data than their predecessors.

As a result of technical advances in earth-orbiting satellites, communication links between ground stations and satellites are evolving to higher data rates so that fast data transfer of large data files can be achieved. Unlike ground-based communication links over optical fibers which have low loss and low signal disturbance, an optical communication link between a ground station and satellite must propagate through a considerable distance of atmosphere, which can be turbulent and lossy and may have temporary concentrations of particulates (e.g., vapor or smoke) that absorb an optical beam. Additionally, pointing jitter in tracking of a satellite's movement can contribute to signal loss and channel fading. Achieving high-data-rate, error-free communication through long distances of the atmosphere can be challenging.

SUMMARY

The described implementations relate to efficient, high-data-rate, free-space optical communication links. Such links may be used between a ground station and an earth-orbiting satellite or spacecraft, for example, though the links may also be used between two remote stations (one or both of which is ground-based, aeronautical, earth-orbiting, or in outer space). The communication system comprises at least one communication terminal having a large buffer, an automatic repeat request controller, and at least one high-speed optical modem that operates at data transmission speeds up to 100 gigabits/second (Gb/s). The communication terminal can be readily scaled using wavelength-division multiplexing (WDM) to operate with N high-speed optical modems, so that data transmission speeds up to N×100 Gb/s are possible. Adaptive optics can be included to mitigate channel fading due to atmospheric turbulence. High data-transmission efficiencies are possible.

Some implementations relate to a terminal for free-space communication. The terminal can include a data buffer to store data for transmission and an automatic repeat request controller adapted to: maintain a slot buffer to store a plurality of identifiers for a plurality of data blocks, the plurality of data blocks being a portion of the data stored in the data buffer; cycle through the slot buffer a plurality of times; retrieve each data block of the plurality of data blocks from the data buffer in succession according to the plurality of identifiers in the slot buffer in response to cycling through the slot buffer; forward each retrieved data block for transmission to a receiving terminal; receive feedback information from the receiving terminal for each cycle through the slot buffer indicating whether each data block identified in the slot buffer is requested to be retransmitted or is not requested to be retransmitted; replace, in the slot buffer, each identifier of the plurality of identifiers with a new identifier for a new data block that is stored in the data buffer, wherein the replaced identifier is an identifier for which the feedback information indicates that a corresponding data block is not requested to be retransmitted; and leave unchanged, in the slot buffer, each identifier of the plurality of identifiers for which the feedback information indicates that a corresponding data block is requested to be retransmitted. The terminal can further include a first optical transceiver to receive at least a portion of a first data block of the plurality of data blocks from the automatic repeat request controller and to encode the at least a portion of the first data block onto a first optical carrier wave and optics to transmit the first optical carrier wave encoded with the at least the portion of the first data block to the receiving terminal via a free space optical link.

Some implementations relate to a terminal for free-space communication. The terminal can include optics to receive from a transmitting terminal via a free-space optical link a first optical carrier wave encoding a plurality of data blocks in a communication signal, a first optical transceiver to receive a first optical signal from the optics and to decode from the first optical signal frames of data each containing payload data, wherein a data block of the plurality of data blocks comprises the payload data from at least one of the data frames, and a data buffer to store the payload data that are decoded without error from the first optical signal. The terminal can further include an automatic repeat request controller adapted to: maintain a state buffer having a plurality of entries corresponding to the plurality of data blocks; receive the frames of data from the first optical transceiver; extract from a first frame of the frames of data a first identifier for a first data block of the plurality of data blocks, wherein the first data block comprises first data from at least the payload data from the first frame; determine that the first data block is received correctly if the first data is decoded without error; determine that the first data block is received incorrectly if the first data is decoded with error; forward to the data buffer the first data if it is determined that the first data block is received correctly; provide in a first entry of the state buffer, corresponding to a first data block of the plurality of data blocks, a first value indicating that the first data block should be retransmitted if it is determined that the first data block is received incorrectly; provide in the first entry of the state buffer, corresponding to the first data block of the plurality of data blocks, a second value indicating that the first data block should not be retransmitted if it is determined that the first data block is received correctly; prepare feedback information based on the plurality of entries in the state buffer; and forward the feedback information for transmission to the transmitting terminal.

Some implementations relate to a method of free-space optical communication. The method can include acts of:

writing, by an automatic repeat request controller, first entries in a slot buffer to identify a plurality of data blocks stored in a data buffer; cycling through the slot buffer a first time, by the automatic repeat request controller; retrieving in succession the plurality of data blocks from the data buffer that are identified by the first entries in the slot buffer; forwarding in succession, by the automatic repeat request controller, the plurality of data blocks to a first optical transceiver for transmission to a receiving terminal; indicating, by the automatic repeat request controller, with second entries of a state buffer transmission status of each data block of the plurality of data blocks; receiving, by the automatic repeat request controller from the receiving terminal, a feedback message containing a plurality of values that each indicate whether each data block of the plurality of data blocks is to be retransmitted to the receiving terminal or is not to be retransmitted to the receiving terminal; comparing, by the automatic repeat request controller, the plurality of values from the feedback message with the second entries in the state buffer; changing, by the automatic repeat request controller, a first entry of the first entries in the slot buffer to a new entry that identifies a new data block stored in the data buffer in response to the comparing indicating that a first data block of the plurality of data blocks identified by the first entry is not to be retransmitted to the receiving terminal; leaving unchanged, by the automatic repeat request controller, a second entry of the first entries in the slot buffer in response to the comparing indicating that a second data block of the plurality of data blocks is to be retransmitted to the receiving terminal; cycling through the slot buffer a second time in a round-robin protocol; forwarding again, by the automatic repeat request controller, the second data block to the first optical transceiver for re-transmission to the receiving terminal; encoding, by the first optical transceiver, data for each data block of the plurality of data blocks received from the automatic repeat request controller onto an optical carrier wave; and transmitting the optical carrier wave to the receiving terminal via a free-space optical link.

Some implementations relate to a method of free-space optical communication. The method can include acts of: receiving, by an optical assembly, an optical communication signal over a free-space optical link from a transmitting terminal, wherein the optical signal encodes a plurality of data blocks; providing, by the optical assembly, a first optical signal to a first optical transceiver; decoding, by the first optical transceiver, frames of data from the first optical signal, each frame of data containing payload data, wherein a data block of the plurality of data blocks comprises the payload data from at least one of the data frames; receiving, by an automatic repeat request controller, the frames of data from the first optical transceiver; maintaining, by the automatic repeat request controller, a state buffer having a plurality of entries corresponding to the plurality of data blocks; extracting, by the automatic repeat request controller, from a first frame of the frames of data a first identifier for a first data block of the plurality of data blocks, wherein the first data block comprises first data from at least the payload data from the first frame; determining, by the automatic repeat request controller, that the first data block is received correctly if the first data is decoded without error; determining, by the automatic repeat request controller, that the first data block is received incorrectly if the first data is decoded with error; forwarding to a data buffer, by the automatic repeat request controller, the first data if it is determined that the first data block is received correctly; providing, by the automatic repeat request controller, in a first entry of the state buffer, corresponding to a first data block of the plurality of data blocks, a first value indicating that the first data block should be retransmitted if it is determined that the first data block is received incorrectly; providing, by the automatic repeat request controller, in the first entry of the state buffer, corresponding to the first data block of the plurality of data blocks, a second value indicating that the first data block should not be retransmitted if it is determined that the first data block is received correctly; preparing, by the automatic repeat request controller, feedback information based on the plurality of entries in the state buffer; and forwarding, by the automatic repeat request controller, the feedback information for transmission to the transmitting terminal.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

FIGS. 6A-6G illustrate an example updating of slot and state buffers when communicating using an automatic repeat request (ARQ) transmission protocol for a free-space optical communication link.

DETAILED DESCRIPTION

I. Introduction

Figure 1A:
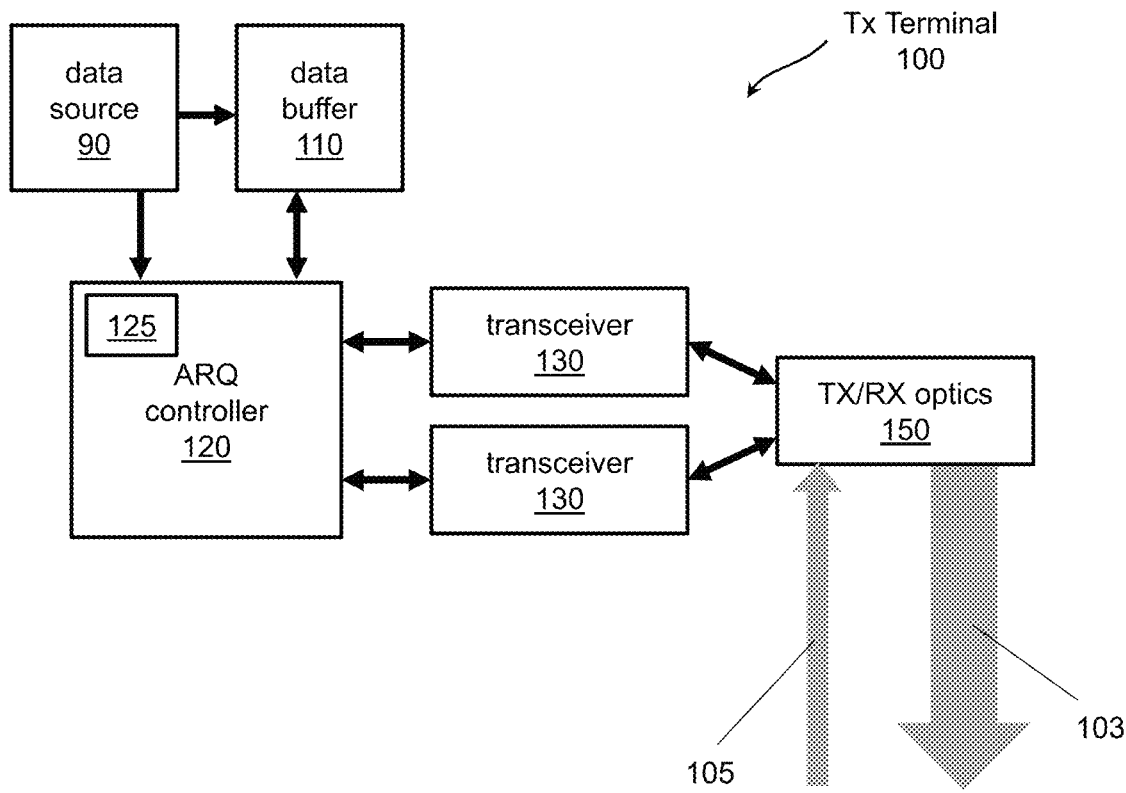
FIG. 1A depicts a free-space optical communication terminal that may be configured to transmit large amounts of data at high data rates.

Efficient, high-data-rate, free-space optical communication is desirable for rapid transfer of large data files between two remote systems, such as an earth-orbiting spacecraft (e.g., a satellite) and a ground station, though other applications can be between two ground-based systems, between two airborne systems, or between two orbiting systems. In this context, high-data-rates mean at least 50 gigabits per second. A low-earth-orbiting (LEO) satellite may have a limited time available during its orbit to transfer large amounts of data acquired during its orbit to a ground station. In some cases, the data-transfer rates from the LEO satellite to the ground station may reach hundreds of Gb/s to offload the data from one orbit and free enough storage space for data acquisition in a subsequent orbit. Such high data-transfer rates may allow terabytes of data to be downloaded on a single pass with a base station. Described below are free-space optical communication systems capable of such high data transfer rates.

Free-space optical communication links are subject to physical channel dynamics such as pointing jitter and atmospheric fading that can result in significant signal power variation over time. Depending on the physical phenomenon present, the bandwidth of these power fluctuations may be as low as 10 Hz or as high as 1 kHz. The power variations can result in bursts of data corruption at the physical layer (bit errors) and/or link layer (dropped frames) that can last milliseconds or longer. Conversely, there can be intervals of error-free data transmission that can last at least two milliseconds and longer between the bursts of data corruption.

There are a number of physical and link layer error-control techniques that may provide reliable communication in the presence of such channel dynamics. Examples include physical-layer coding-and-interleaving, link-layer automatic repeat request (ARQ) protocols, and hybrid protocols that span both layers. These methods and their implementations vary in metrics such as throughput efficiency, complexity, and latency. They each can use one or more data buffers at the source and destination terminals. The size of the buffer (in bits) depends on the error-control method and the bandwidth of the power fluctuations and in general scales with data rate of the link. Thus, high data rate systems that use these techniques use large buffers to guarantee reliable data transfer.

For orbiting satellites, the channel fading characteristics can vary during a portion of the orbit during which the satellite communicates with a ground station. For example, atmospheric turbulence can be greater when the satellite is at low angles (nearer the horizon) than directly over the ground station (90 degrees). One approach to dealing with channel fading variations is to change to data transfer rate from a smaller rate when the satellite is near the horizon to a larger data rate when the satellite is directly overhead. However, a continual variation in data rate and synchronization of data rates can be hard to implement in practice when there are drop-outs in communications between transmitting and receiving terminals. Another approach is to wait until the satellite is in a low-error-rate region above the ground station and then transfer data at a highest data rate possible (e.g., up to a terabyte per second). However, doing so can result in an appreciable loss of transmission time where the satellite is in view of the ground station but in a region of space that incurs an unacceptably high bit error rate at the highest data transmission rate.

The communication systems described herein can overcome some limitations of the above described approaches. The systems use a flexible ARQ protocol in which transmission at a high data rate per channel is maintained throughout the portion of the orbit during which the satellite is in view of the ground station (an "in-view" window). The ARQ protocol tracks the success or failure of reception of each transmitted data block and retransmits a data block when it is not successfully received. To address variation in channel fading characteristics, the size of the data blocks can be flexibly adapted based on the timescale of channel fading characteristics. For example, when the satellite is nearer the horizon and atmospheric turbulence is larger, the size of the data block can be made smaller than when the satellite is directly over a ground station. When the data block size is smaller, a corrupted portion of the data block results in less total amount of data to be retransmitted than if the data block were larger. Further, because the communication systems can employ wavelength division multiplexing that is employed in optical communication systems, the total data transfer rate can be scaled by the number of channels (wavelengths) used to transfer data. In this manner, very high data rates with high throughput efficiency can be achieved throughout the satellite's in-view window. These aspects will become more apparent with the following description.

II. Communication Terminals

FIG. 1A depicts a free-space optical communication terminal 100 that is adapted to use a link-layer ARQ protocol. The communication terminal can be implemented with an addressable data buffer 110, ARQ controller 120, at least one high-speed optical transceiver modem 130, and transmit and receive optics 150. The terminal 100 can support reliable data delivery at very high data rates (e.g., up to 100 Gb/s and even higher) in a free-space optical downlink 103. At such data rates, substantial cost benefits can be gained by adapting commercial modem technologies (e.g., from terrestrial fiber networks) to free-space optical links. Such data rates on a low-earth orbiting satellite can allow terabytes of data to be transferred on a single pass with a base station. The communication terminal 100 may receive data over a free-space optical uplink 105 at significantly lower data rates (e.g., less than 100 megabits/second or even less than 10 kilobits/second in some cases). The received data over the uplink can aid in providing uncorrupted data to a receiving communication terminal 101, such as that depicted in FIG. 1B. The communication terminal 100 depicted in FIG. 1A can be located on an earth-orbiting satellite while the communication terminal of FIG. 1B can be located at a ground station, for example.

The communication terminal 100 of FIG. 1A will now be described in further detail, though relevant parts of the description can pertain to analogous components in the communication terminal 101 of FIG. 1B so that the parts of the description need not be repeated for the analogous components. The data buffer 110 can comprise one or more addressable memory devices (such as random access memory (RAM) circuits) that can store large amounts of data. The data buffer 110 can include logic circuitry to store data to and readout data from memory elements in the data buffer. The amount of data stored by the data buffer 110 can be any value between 100 megabytes (MB) and 100 gigabytes (GB). In some cases, the amount of data stored by the data buffer 110 may be between 100 GB and 40 terabytes (TB). Unlike terrestrial fiber-based networks that avoid employing an ARQ protocol, the buffer 110 may have a significantly larger size than buffers used for terrestrial fiber-based networks. The data buffer 110 may be in communication with one or more data sources 90 (e.g., memory devices, sensors, imaging devices, etc.) that may have slower read and write speeds or data output rates than the speed at which data can be read from the data buffer 110. In some cases, the buffer 110 can be implemented in a parallelized architecture that employs multiple memory modules and multiple read and/or write drives to attain high read and/or write speeds between the buffer 110 and ARQ controller 120, as described further below in connection with FIG. 4.

The ARQ controller 120 implements an ARQ protocol, which involves interfacing with the data buffer 110 and with the physical-layer modem (transceiver(s) 130). The ARQ controller 120 may comprise at least one processor 125 (e.g., digital signal processor, field-programmable gate array, microprocessor, application-specific integrated chip, or some combination thereof) that is adapted with code to communicate with the data buffer 110, control reading data from and optionally writing data to the data buffer 110, prepare the data for transmission, and forward the data at least once to a transceiver 130 for transmission over a free-space optical link 103. The ARQ controller may maintain and update buffers relating to blocks of data, or subblocks in some cases, that are transmitted over the optical link 103, as described further below. The ARQ controller 120 may control readout of data from the buffer 110, prepare the data for transmission, and send the data to the transceiver (s) at data rates as high as or higher than those achieved with each transceiver 130.

Each transceiver 130 may comprise a high-speed optical transceiver that can encode data received from the ARQ controller 120 onto an optical carrier wave for transmission of the data over the free-space optical link 103. Although two transceivers are shown in FIG. 1A, a free-space optical communication terminal 100 may have N transceivers 130, where N is an integer having a value from 1 to 10. In some cases, more transceivers 130 may be used. An example of a coherent optical transceiver is a commercial 100 Gb/s coherent optical transceiver that may be used in terrestrial fiber-based networks, such as the CFP-100G-LR4 coherent transceiver available from Cisco Systems, Inc. of San Jose, Calif.

Figure 1B:
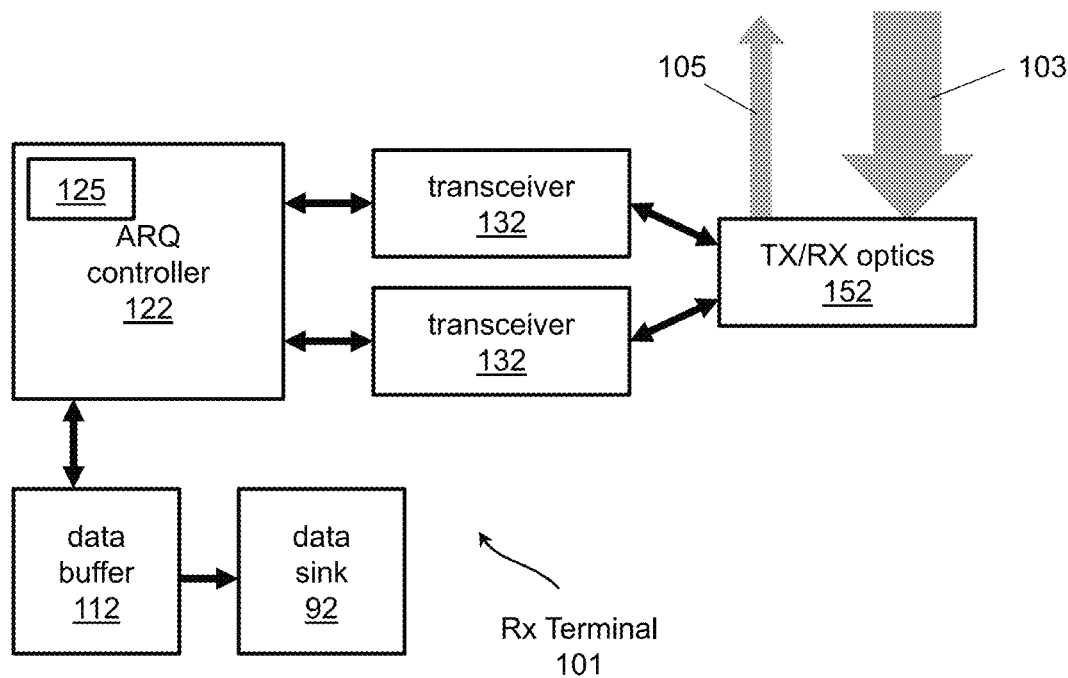
FIG. 1B depicts a free-space optical communication terminal that may be configured to receive large amounts of data at high data rates.

FIG. 1B depicts a second communication terminal 101 that can communicate with the first communication terminal 100 over free-space optical links 103, 105. An advantageous feature of the communication terminals 100, 101 is that they may use identical components. For example, the transceivers 130, 132 and data buffers 110, 112 may be identical hardware components. The transmit and receive optics 150, 152 may be similar, though in some cases the transmit and receive optics 152 may include adaptive optics and adaptive optic control circuitry whereas the transmit and receive optics 150 may not. The inclusion of adaptive optics and adaptive optics control circuitry on the receiving terminal 101 can make it possible to use the transmitting terminal 100 without adaptive optics on a satellite, for example. The ARQ controllers may comprise similar or identical hardware but may be programmed to operate differently. For example, the ARQ controller 120 may be programmed to retrieve data from the data buffer 110 and determine when to send and resend the data to the transceivers 130 for transmission at high data rates over the free-space optical link 103 (functionality suitable for transmitting data at a high data rate), whereas the ARQ controller 122 may be programmed to receive data from the transceivers 132 at high data rates, determine whether the received data is corrupted, and send uncorrupted data to the buffer 112 for storage (functionality suitable for receiving data error-free at a high data rate). The second communication terminal 101 may be located on a ground station, spacecraft, or aircraft.

Figure 1C:
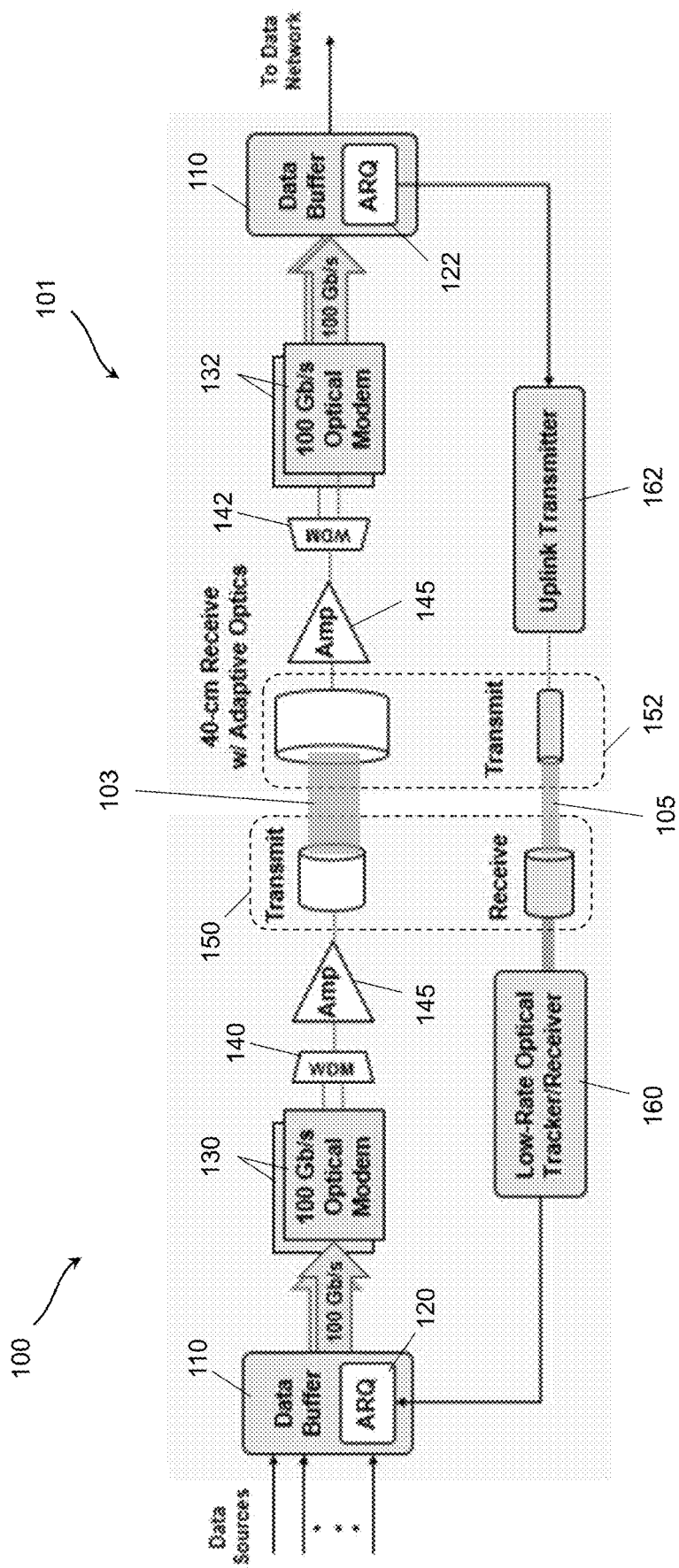
FIG. 1C depicts a free-space optical communication system that employs wavelength division multiplexing and optical amplification.

FIG. 1C depicts a free-space optical communication system that employs wavelength division multiplexing and optical amplification. The transmitting communication terminal 100 can include a wavelength-division multiplexer 140 that combines optical outputs from two or more transceivers 130 onto a common optical path, such as a single optical fiber. Outputs from the transceivers 130 can be at different optical wavelengths. The transmitting communication terminal 100 can also include an optical amplifier (such as an erbium-doped fiber amplifier) to boost the optical signal(s) before launching into free space by the transmit and receive optics 150. The transmitting communication terminal 100 can include a lower data rate optical tracker/receiver 160 to receive an uplink optical signal and to aid in a pointing, acquisition, and tracking process described below.

Figure 1D:
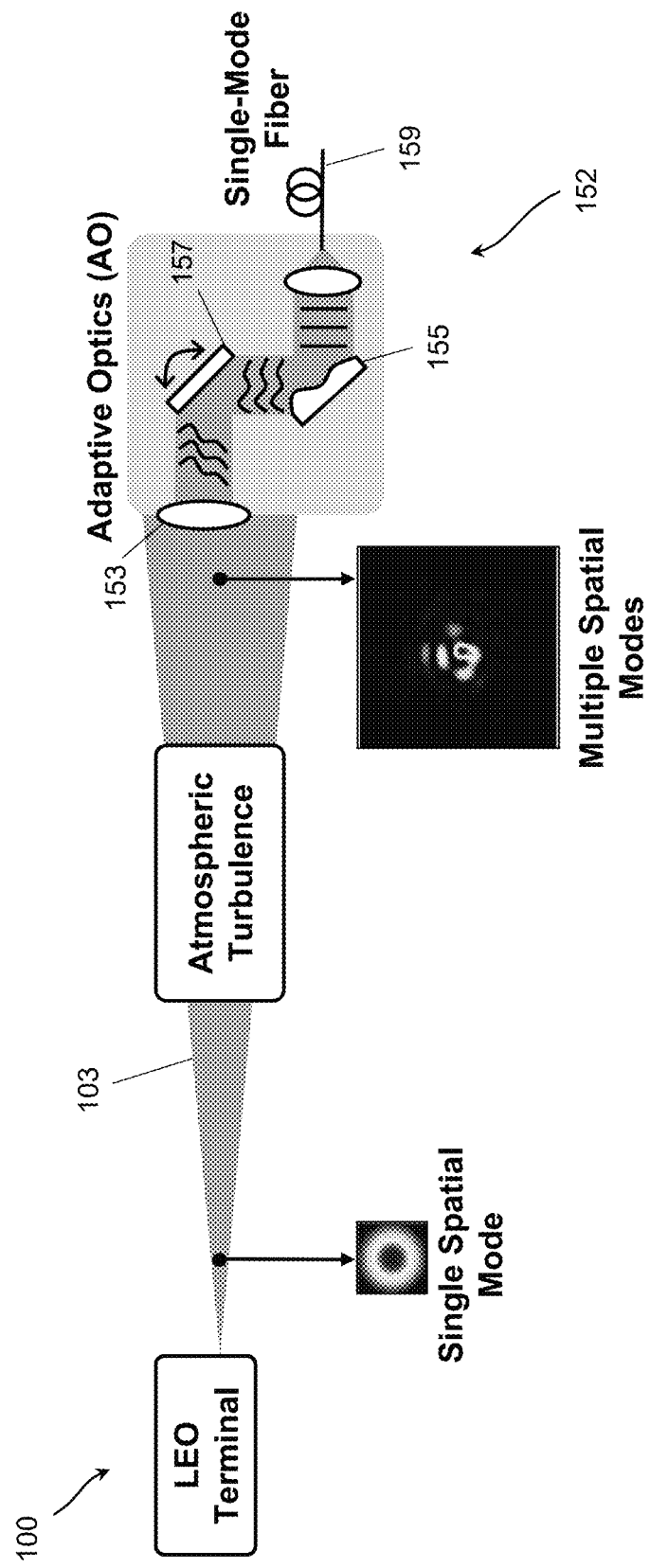
FIG. 1D depicts further details of transmit and receive optical components that may be used in a free-space optical communication terminal of FIG. 1A and/or FIG. 1B.

The receiving communication terminal 101 can include a wavelength-division multiplexer 142 to demultiplex two or more optical signals at different wavelengths from a common optical path onto separate optical paths that connect to two or more transceivers 132. The receiving communication terminal 101 can also include an optical amplifier 145 to increase the strength of the optical signals received via the downlink 103. The transmit and receive optics 152 can include at least one 40-cm-diameter lens 153 (see FIG. 1D) that receives the optical carrier wave(s) of the optical downlink 103. The transmit and receive optics can further include at least one adaptive optic 155 to compensate for wavefront distortions in the received optical beam(s). The wavefront distortions can be due to atmospheric turbulence and create intensity variations across the beam(s).

Figure 1E:
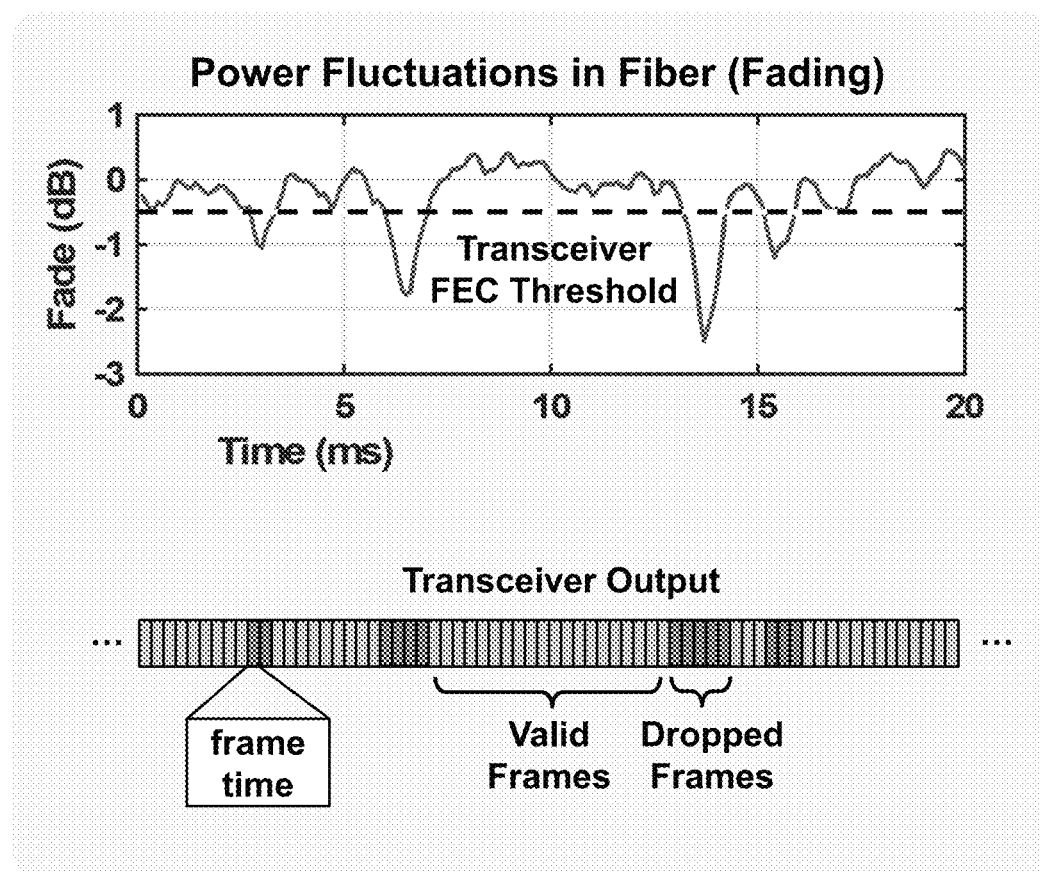
FIG. 1E depicts channel fading dynamics and dropped frames of data in a free-space optical communication system.

Such intensity variations can manifest as multiple spatial modes and adversely affect power coupling of the received optical beams (e.g., power coupled into an optical fiber 159 for subsequent signal decoding and processing). The wavefront distortions can vary in time and lead to increased coupling loss, causing channel fading which is plotted in the graph of FIG. 1E. In some cases, the loss is large enough to drop the signal power below a forward error correction threshold (indicated by the dashed line). When this happens, the data cannot be received without error and frames of data can be dropped, as depicted in FIG. 1E. By keeping the frame time short (e.g., on the order of or less than the time scale for which power drops below the forward error correction (FEC) threshold), then the amount of data that must be retransmitted due to a dropped frame can be reduced compared to a case where the frame time is significantly longer than the power drop-out time.

For the implementation of FIG. 1C, the transmitter 162 and receiver 160 for the uplink 105 can be different apparatus from the transceivers 130, 132 for the downlink 103. This is possible since the uplink data rate can be significantly lower (by orders of magnitude) than the downlink data rate. Whether or not the transmitters and receivers differ for the uplink 105 and downlink 103, the uplink 105 can be in band with or out-of-band from the downlink 103. When out of band, the uplink 105 can use an optical carrier wave having a different wavelength than the wavelength(s) used in the downlink 103. In some cases for an implementation like that shown in FIG. 1C, the uplink 105 can use an RF carrier wave whereas the downlink utilizes one or more optical carrier waves.

FIG. 1C depicts the automatic repeat request controllers 120, 122 as integrated with the data buffers 110, 112. Implementing the ARQ logic on a same board as the data buffer can improve the speed of data transmission. Advantageously, the transmitting communication terminals 100 of FIG. 1A and FIG. 1C can be assembled into a small package. For example, this package can be no larger than a 3-unit payload size for a satellite.

Figure 2:
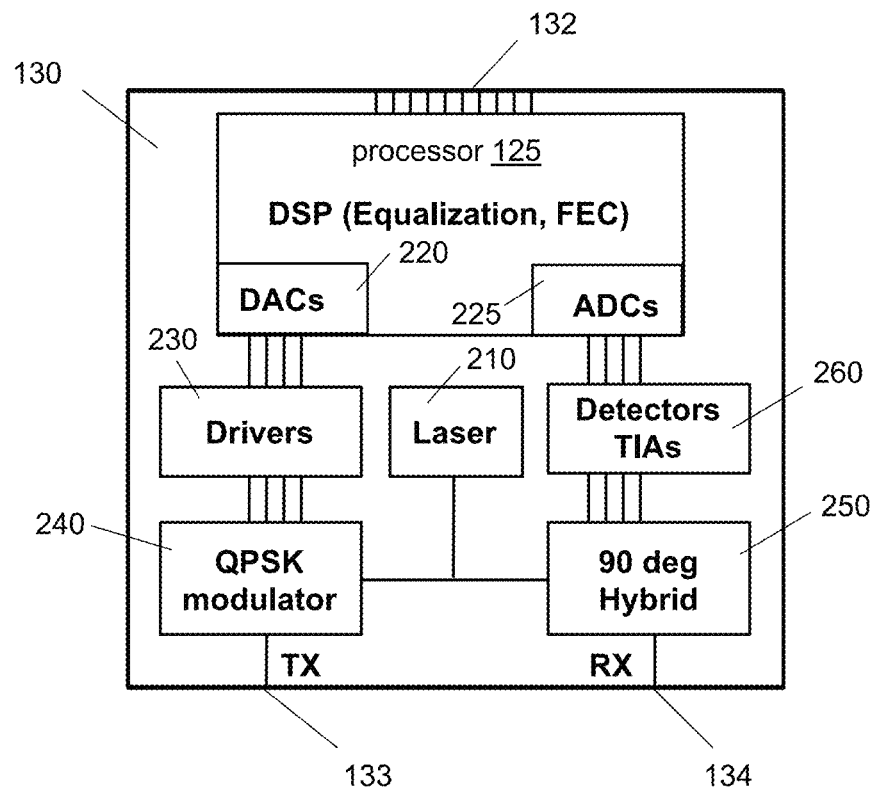
FIG. 2 depicts an example of a high-speed optical modem that may be used in a free-space optical communication terminal of FIG. 1A and/or FIG. 1B.

Example components of a high-speed optical transceiver 130 that can be used with the transmitting communication terminals 100 of FIG. 1A and FIG. 1C are shown in FIG. 2. First data input/output ports 132 of the transceiver 130 may comprise multiple wired data links (e.g., Ethernet cable data links) that connect to read/write circuitry of the buffer 110. Second data input/output ports (transmit port 133 and receive port 134) of the transceiver 130 may each comprise a fiber-optic link (e.g., a single-mode optical fiber). The transmit port 133 can carry at least one optical carrier wave (from at least one laser 210) that is modulated with data from the buffer. The receive port 134 can also carry at least one optical carrier wave from a received optical signal.

The transceiver 130 can include electronic and optical components (e.g., a processor 125 which is a digital signal processor (DSP) in the illustrated implementation, digital-to-analog converters (DACs) 220, analog-to-digital converters (ADCs) 225, line drivers or amplifiers 230, at least one integrated optical modulator 240, at least one integrated optical receiver 250, and photodetectors and transimpedance amplifiers 260) to encode data read from the buffer onto at least one carrier wave and to decode received data that has been encoded onto at least one carrier wave from the laser 210. In some implementations, the integrated optical modulator 240 is configured to perform quadrature phase-shift keying to encode data from the buffer 110 onto an optical carrier wave. The integrated optical receiver 250 can comprise a 90-degree optical hybrid for receiving and demodulating incoming optical signals. The transceivers 130, 132 may further execute instructions on the processor 125 that are stored in memory to implement at least forward error correction (FEC). A transmit (Tx) port 133 and receive (Rx) port 134 at the transceiver 130 are indicated in FIG. 2 and may connect to single mode optical fibers running between the transceiver(s) 130 and the transmit and receive optics 150.

The transmit and receive optics 150 can include optics to receive, from the transceiver(s), one or more single-mode beams output from one or more optical fibers of the transceiver 130, combine multiple beams (if present) onto a common optical path, enlarge the beam waist(s), and output a collimated or diverging beam for transmitting the data over the free-space optical downlink 103. The optics 150 may include one or more fiber couplers (e.g., lens(es), graded-refractive index lens(es), and/or tapered core fiber(s)), wavelength-division multiplexors (e.g., integrated optical multi-mode interference couplers, resonant cavities, gratings, ring resonators, waveguide couplers, etc.), polarization combiners, beam expanders, optical amplifiers, adaptive optics, adaptive optic control circuitry, mirrors and/or actuators for beam steering, control circuitry for beam steering, or some combination of the foregoing components. The output beam from the transmit and receive optics 150 may comprise one or more wavelengths of radiation (e.g., infrared wavelengths between 1100 nm and 1600 nm) for wavelength division multiplexing. In some cases, the optical beam(s) of the optical downlink 103 may have different wavelengths than the optical beam(s) of the optical uplink 105 for an out-of-band return signal, so that a common optical path can be used for transmitted and received optical beams and so that the received optical beam for the uplink 105 can be separated onto a receive optical path for the transceiver(s) 130.

As indicated above, the communication terminal 100 can be compatible with standardized link-layer technologies, such as Ethernet that employs coherent optical transceivers. This compatibility can allow the ARQ system to be paired with physical-layer modem technologies that use standardized link-layer interfaces and high data rates. Communication terminals 100, 101 can be used for data delivery over point-to-point links as well as more general data networks that may include multiple sources and destinations and multiple hops between source and destination.

III. Terminal Operation

Figure 3:
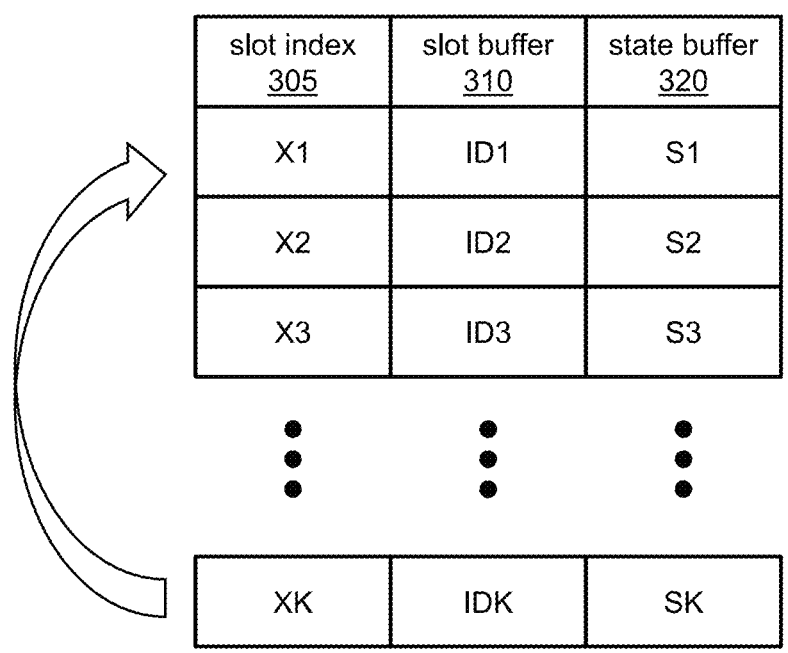
FIG. 3 illustrates examples of buffers that may be used by an ARQ controller of a free-space optical communication terminal of FIG. 1A.

An example operation of the communication terminals 100, 101 can be as follows:

1. One or more sensors and/or one or more imaging devices associated with the first communication terminal 100 of FIG. 1A collects data and sends it to the ARQ controller 120 and/or to the data buffer 110 for storage in the data buffer 110. The data may be stored in one or more data files in the data buffer 110.
2. The file(s) can be parsed by the ARQ controller 120 (e.g., by processor 125 or logic circuitry of the buffer 110) into blocks and possibly sub-blocks that are uniquely identified with one or more identifiers for transmission.
3. When a free-space optical link is established with a second communication terminal 101, reliable transfer of the file(s) to the second communication terminal 101 can begin using an ARQ protocol that is described in further detail below.
4. The ARQ controller 120 prepares a slot buffer 310 that contains identifiers (ID1, ID2, . . . IDK) for the blocks and/or sub-blocks in the data buffer 110 to be transmitted and a state buffer 320 that includes corresponding information (S1, S2, . . . SK) about the success and/or failure of data transfer, as depicted in FIG. 3. The ARQ controller 120 may or may not prepare a slot index buffer 305 to store indexing information to the associated entries in the slot buffer 310 and state buffer 320.
5. The ARQ controller 120 cycles through the slot buffer 310 in round robin to retrieve data identified by each identifier in the slot buffer 310 and prepares frames that include the retrieved data with header information and sends the frames to the transceiver(s) 130 for high data-rate transmission over the optical link 103

6. The ARQ controller 122 analyzes received frames and data from the optical link 103 and determines whether the data is corrupted (lost bits due to power fluctuations, incorrect bits determined from a cyclic redundancy check, for example).

7. If the received data is not corrupted or can be repaired using FEC, the ARQ controller 122 forwards the data for storage in data buffer 112 and prepares and sends a feedback message over the optical link 105 indicating the data was received successfully without any data errors. Any feedback messages can be in-band or out-of-band with regard to the optical link 103.

8. If the received data is corrupted, the ARQ controller 122 prepares and sends a feedback message over the optical link 105 that results in a request for retransmission of the data by ARQ controller 120.

9. As feedback messages are received, the ARQ controller 120 processes them to determine whether successful or unsuccessful reception of data frames has occurred. The ARQ controller 120 continues cycling through the slot buffer 310 and state buffer 320 in round robin manner.

10. When the ARQ controller 120 determines that unsuccessful reception of a data block or sub-block occurred, the ARQ controller 120 re-retrieves the data from the buffer 110 and sends the data back to the transceiver(s) for re-transmission to the second communication terminal 101.

11. When the ARQ controller 120 determines that successful reception of the data occurred, the ARQ controller 120 updates entries in the slot buffer 310 and state buffer 320 with new information to identify a new data block or sub-block that can be retrieved from the data buffer 110.

12. The operations of the two ARQ controllers 120, 122 continue until all data blocks for the file(s) are transferred or the optical links 103, 105 can no longer be maintained (e.g., because the satellite has moved out of range).

13. The file(s) stored in buffer 112 can then be retrieved by a data sink 92 (e.g., a computing or data-processing system of an end user) at any data rate and at any time. For example, this transfer could begin during the space-to-ground transfer, or it could occur after the space-to-ground transfer is complete. It could also occur using equivalently high-data-rate communications over a terrestrial fiber optic network.

FIG. 3 depicts examples of a slot index buffer 305, a slot buffer 310, and a state buffer 320 that may be created in memory and maintained by the transmitting ARQ controller 120 during transmission of data from the data buffer 110. Each buffer can comprise read/write memory elements. The ARQ controller 120 may create and maintain only a slot buffer 310 in some cases, or it may create and maintain the slot buffer 310 in combination with at least one of the other buffers in some cases. The slot buffer 310 can include a plurality of entries storing identifiers (ID1, ID2, . . . ) that each identify, for example, the starting location in the data buffer 110 of one of the plurality of data blocks 410 stored in the data buffer. Each buffer 305, 310, 320 can have a same number of entries (K in the illustrated example, where K is an integer greater than 1). The value of K can be selected based on transmission characteristics as described below. The entries that correspond to a data block (e.g., entries "2" and "S2" for data block "ID2") can be stored in association with each other (e.g., using predetermined offsets in memory address from each other, or by cross-referencing memory addresses in each entry) so that the corresponding entries can be readily retrieved together.

The above example can provide a file store-and-transfer service for latency-tolerant users. The ARQ protocol can provide high throughput efficiency and low complexity at the potential expense of latency. An example latency-tolerant application is the storage and transfer of data from a low-earth-orbiting satellite to a ground station, which can have a delay due to the limited link availability (e.g., a limited available time slot for data transfer during each orbit).

Further details of the ARQ protocol and ARQ controller actions will now be described. An objective of the communication terminals 100, 101 and ARQ protocol is high-speed, high-efficiency, error-free link-layer transfer of signals and/or data files from one communication terminal 100 to another communication terminal 101. In this regard, high-speed can be at least 100 Gb/s, high link-layer throughput efficiency can be at least 80%, and low-data-rate feedback can be less than 10 kilobits per second (kb/s). High speed data rates are possible using the transceivers 130 and terminal designs described above. High throughput efficiency and low-data-rate feedback are possible by selecting appropriately sized data blocks 410 as described herein and feeding back information from the receiving terminal's state buffer 322 (e.g., one bit for each data block) that indicates whether or not the data block was received successfully. Efficiency of data transfer can also be improved using adaptive optics to compensate for atmospheric turbulence and FEC.

The throughput efficiency is determined as a ratio of realized data transfer rate to transceiver transmission data rate. The realized data transfer rate is computed by dividing an amount of correct data received by the total time taken to send the data one or more times to yield the amount of correct data. Since some data frames may be dropped, they will be sent more than once, reducing the realized data transfer rate.

Figure 4:
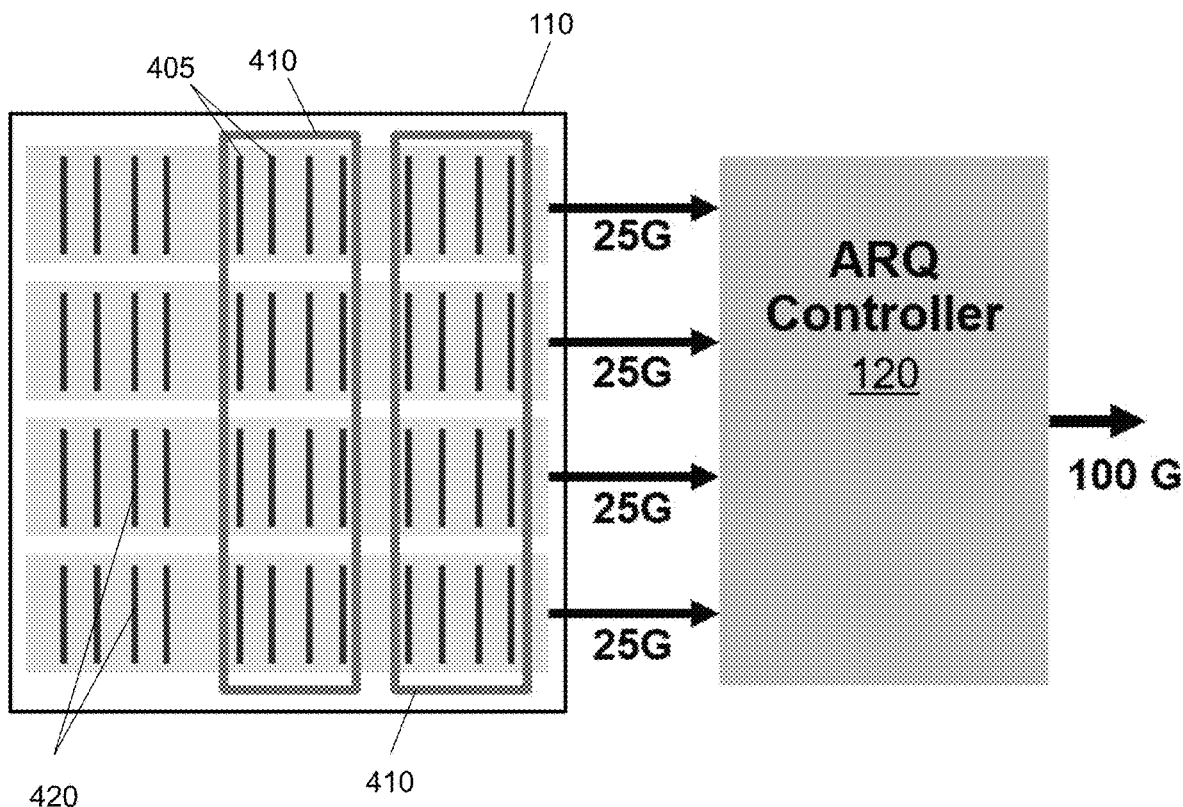
FIG. 4 depicts a parallelized buffer architecture for storing and forwarding large amounts of data to an ARQ controller of a free-space optical communication terminal of FIG. 1A.

Once optical links 103, 105 have been established between two communication terminals 100, 101, the ARQ controller 120 can partition the address space and corresponding data to be transferred into smaller sized data blocks 410, which also may be referred to as "ARQ blocks." The data blocks can be portions of the total amount of data in the buffer 110 that is to be transferred. In some cases, a data block 410 can be a portion of a data file that is stored in the buffer 410 (e.g., a portion of a digital high-resolution image). One way to partition the data in a buffer 110 into data blocks 410 is depicted in FIG. 4. For the implementation of FIG. 4, the buffer 110 comprises multiple memory devices 420 (e.g., memory drives) configured to output data in parallel at high data rates over multiple cables to the ARQ controller 120.

A data block 410 can be striped or divided across the multiple memory devices 420 having separate data drivers that each operate at a high data readout and/or write speed (e.g., 25 Gb/s in the illustrated implementation). By dividing the data for a data block across the multiple memory devices 420, the data for a data block 410 can be read out of the buffer 110 in preparation for transmission at a data rate of N×R where N is the number of memory devices 420 and R is the readout rate for each memory device. For the illustrated example, 100 Gb/s read-out of the data from the buffer 110 for a data block 410 is possible. Each memory device 420 may comprise memory sub-blocks 405 (sometimes referred to as "atoms") that can be the smallest unit of data read out by the memory device's read-out circuitry. As one example, the size of the sub-block 405 can be 2 kB, though other sizes can be used in other implementations. There can be many sub-blocks in a data block 410.

Although FIG. 4 indicates that the buffer 110 contains four similar memory devices 420 with identical read-out speeds and an equal number of sub-blocks 405 from each memory device in a data block 410, the invention is not so limited. The buffer 110 may comprise fewer or more than four memory devices 420. The read-out speeds of the memory devices 420 may differ between at least two of the memory devices. The size of the sub-blocks 405 may differ between at least two of the memory devices 420.

In some implementations, the size of a data block 410 can be determined by a user of the system and is not limited to a fixed size. In some cases, the size of the data block 410 can be selected based upon fading characteristics in a communication channel (e.g., average time scale of power fluctuations which may be based on a dominant frequency of the power fluctuations, average duration over which data is received correctly, average duration of signal drop-outs, or some combination of these factors). Selecting a larger data block size can reduce the uplink data rate, though may reduce the efficiency of downlink data transfer if large amounts of data are requested to be retransmitted. Selecting a smaller data block size can increase the uplink data rate and can improve the efficiency of downlink data transfer.

For example, if the average duration over which data is correctly received is $T_a$ seconds (e.g., an average interval between times when the received signal power falls below the forward-error correction limit as in FIG. 1E), then the data block size may be selected to be approximately $T_a \times R$, or less than this value, where R is the total data read-out rate from the buffer 110. With the example of FIG. 4 and a 0.5 millisecond average error-free received signal duration, then the data block size may be selected to be approximately 100 Gb/s×0.5 ms, e.g., 5 megabytes (MB). As another example, if the average duration of signal drop-outs is $T_b$ seconds (e.g., an average time interval during which the received power is below the FEC limit), then the data block size may be selected to be approximately $T_b \times R$ or less than this value.

In some implementations, the data block size can be selected automatically by the ARQ controller (e.g., on the fly during data transmission) based upon one or more of the above factors (power fluctuations which may be measured by the receiving ARQ controller 122 and fed back over the uplink 105 to the transmitting ARQ controller 120, average duration of error-free data transmission, average duration of signal drop-out) that are determined by the ARQ controller 120 during the data transmission. For example, if signal fading and signal drop-outs become more frequent during a transmission, the ARQ controller 120 may reduce the size of the data block. If signal fading and signal drop-outs become less frequent during a transmission, the ARQ controller 120 may increase the size of the data block. The signal fading and signal drop-out characteristics can be determined from feedback signals from the second communication terminal 101 (e.g., the returned data from the state buffer 322 described below) that indicate whether data blocks were received successfully or unsuccessfully.

The ARQ controller 120 can associate a sequence number or a first unique identifier (numeric or alpha-numeric code) with each data block 410 (coming from the buffer 110) that identifies where the data block is ordered in relation to other data blocks retrieved from the buffer 110. The sequence number or first unique identifier can be used by the receiving ARQ controller 122 to reassemble data blocks 410 for storage. The sequence number or the first unique identifier can also be used by the transmitting ARQ controller 120 to re-retrieve data from the buffer 110 when transmission of the data block 410 was unsuccessful.

Figure 5A:
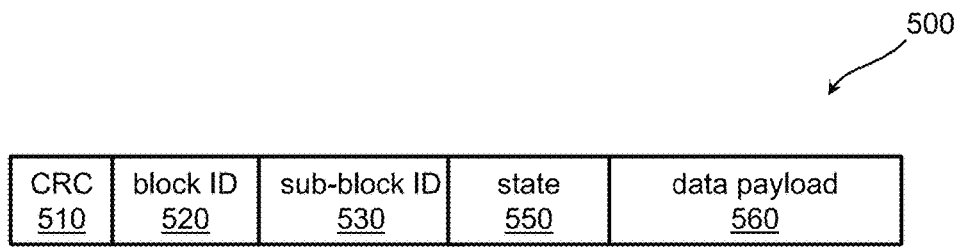
FIG. 5A depicts an example of a frame of data that can be used in a free-space optical communication system to communicate data between the terminals of FIG. 1A and FIG. 1B.
Figure 5B:
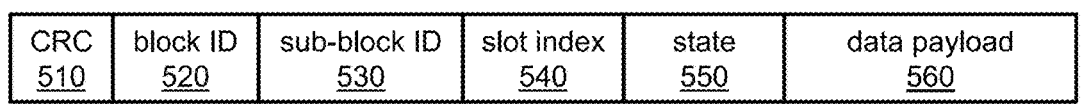
FIG. 5B depicts another example of a frame of data that can be used in a free-space optical communication system.

FIG. 5A and FIG. 5B show examples of a data transmission frames 500, 501 that can be sent during communication between communication terminals 100, 101. Multiple frames 500, 501 can be transmitted in sequence over the optical link 103 during the communication. Each data block 410 (if small enough) or a sub-block of a data block 410 that has been extracted by the ARQ controller 120 can be loaded into a corresponding frame 500, 501 for transmission as the data payload 560 of the frame. In some implementations, the frame 500, 501 can be prepared according to, and be compatible with, Ethernet protocols or other standardized protocols. The frame 500, 501 can include a header portion or metadata that may include one or more of the following items: an error check value 510 (e.g., a cyclic redundancy check (CRC) value), a block identifier 520, a sub-block identifier 530, a slot index value 540 (FIG. 5B), and a state value 550.

In an example implementation that is adapted for Ethernet protocols, the size of a data block 410 may be significantly larger than the size of a standard Ethernet payload (e.g., at least two times larger than a standard Ethernet payload). In some cases, tens, hundreds, or thousands of Ethernet frames may carry the data of one data block 410. Accordingly, the ARQ controller 120 can further partition data blocks 410 received from the buffer 110 into smaller sub-blocks that are the same size or smaller than the payload 560 of the packet or frame 500, 501. Any unused space in a payload may be designated as null or padded with null identifiers. The sub-blocks can be assigned a second identifier (numeric or alpha-numeric code that may be used as the sub-block identifier 530) that identifies their relative ordering within the data block 410 to which it belongs. In some cases, the size of a data block 410 can be selected by the ARQ controller 120 to fit within a standard Ethernet payload, for example, in which case the ARQ controller 120 may not partition the data blocks 410 into smaller sub-blocks.

The block identifier 520 of a frame 500, 501 can identify to which data block 410 the data payload 560 belongs. In some cases, the block identifier may have a same value as the entry (e.g., ID1) in the slot buffer 310 that is used to identify the data block 410 retrieved from the buffer 110. The sub-block identifier 530 (if used) can identify to which data sub-block the data payload 560 belongs and may further identify a relative position or location for the payload data within other data transmitted by the transmitting communication terminal 100 for a data block 410. For example, a data block 410 parsed into three sub-blocks can have the following block identifiers (first number in pair) and sub-blocks identifiers (second number in pair): (001,01), (001,02), (001,03). These identifier combinations can be used by the receiving communication terminal's ARQ controller 122 to determine the order of sub-blocks in the corresponding data block 410 and to reassemble the data in an intelligible order.

During transmission of data files, the transmitting ARQ controller 120 and the receiving ARQ controller 122 can coordinate with each other to ensure that the transmitting ARQ controller 120 re-transmits data blocks 410 that were not successfully received by the receiving ARQ controller 122. The coordination can be accomplished by means of header data in a transmission frame 500, 501 and feedback messages returned to the transmitting ARQ controller 120 in the optical uplink 105. Aspects of the coordination and ARQ protocol include the following features:

1. The transmitting ARQ controller 120 continuously retrieves data blocks 410 from the data buffer 110, placing the data into one or more frames 500, 501 with header information, and passing the frames to one or more transceivers 130 for transmission over the optical link 103. There can be no wait time or idling between frame assembly and subsequent transmission of the data frame, so that the data is output at high data rates (e.g., 100 Gb/s for the illustrated example of FIG. 4).
2. If the feedback messages received from the receiving ARQ controller 122 indicate error-free transmission of the data blocks, then the ARQ controller 120 continues working its way through the data in the buffer 110.
3. The transmitting ARQ controller 120 only re-transmits data blocks 410 (and/or sub-blocks) that were not successfully received by the receiving ARQ controller 122, and does not have to retransmit an entire data file, for example.
4. The data in the buffer 110 can be successfully transferred from the transmitting terminal 100 to the receiving terminal's buffer 112 (with some portions of the data being retransmitted), even though there may be initial transmission errors detected and reported back on the optical uplink 105.
5. The sub-blocks of a data block 410 may be transmitted out-of-order without compromising the ARQ protocol.

Features 1-3 can result in a high link-layer throughput efficiency.

To transfer a data file, the ARQ controller 120 retrieves data blocks 410 from the buffer 110, as determined by the ARQ protocol. Initially, the data blocks 410 may be retrieved in a sequential or non-sequential order as the ARQ controller 120 reads out data values from the memory devices 420 and works its way through data stored in each memory device. If the ARQ controller 120 subsequently learns from a feedback signal transmitted by the receiving ARQ controller 122 that a data block 410, or sub-block thereof, was not received successfully, the ARQ controller 120 may repeat a request to retrieve data from a previously read portion of at least one of the memory devices 420, temporarily interrupting its order of retrieving data from the memory devices 420, and prepare the re-retrieved data that was not received successfully into one or more frames 500, 501 for retransmission. The retransmitted frames can be transmitted again with the same block ID 520 and/or sub-block ID 530 values that were transmitted with the original frames.

When preparing data for transmission, the ARQ controller 120 can load a data block 410 (if small enough) or one of its sub-blocks into a transmission frame's data payload 560 as described above. The ARQ controller 120 can also create corresponding entries in its slot buffer 310 and state buffer 320 (shown in FIG. 3) before or after retrieval of data from the buffer 110 to keep track of the data payloads 560 and/or data blocks 410 sent in successive frames 500, 501 and to monitor the status of transmission of the data payloads 560 and/or data blocks 410.

According to one implementation, the ARQ controller 120 can write an identifier (e.g., ID1) in the slot buffer 310 for a data block 410 that is to be retrieved from the buffer 110 and transmitted to the other terminal. In some cases, the identifier written into the slot buffer 310 can be a memory address, index value of a look-up table, a pointer value, or other value that identifies a desired data block 410 in the buffer 110. In some cases, the identifier written into the slot buffer can be used by the ARQ controller and/or read-out circuitry of the buffer 110 to identify the location(s) in memory of the data block 410. The slot buffer 310 can include a plurality of identifiers (ID1, ID2, ID3, . . . ) corresponding to a plurality of data blocks 410 that are transmitted. By cycling through the slot buffer 310, data blocks can be retrieved from the buffer 110 and prepared for transmission. The slot buffer 310 can have a length of K entries, where K is an integer value.

IV. Data Transmission

To track which data blocks 410 have not yet been transmitted, the transmitting ARQ controller 120 can maintain a variable N that identifies or is used to identify the minimum sequence number (or memory address) for a data block 410 that has not yet been retrieved by the ARQ controller 120 for transmission. Prior to the file transfer, N can be initialized to a value that identifies or is used to identify the first data block 410 in the file (or its location in memory) to be transferred. The value N can be incremented by 1 (or the size of a data block 410) as data blocks 410 are read from the buffer 110 by the transmitting ARQ controller 120. Once the end of the slot buffer 310 has been reached (e.g., N=K, where K is the length of the slot buffer), N can only be incremented upon receipt of a feedback message indicating successful reception of a data block 410 by the receiving ARQ controller 122.

Figure 7:
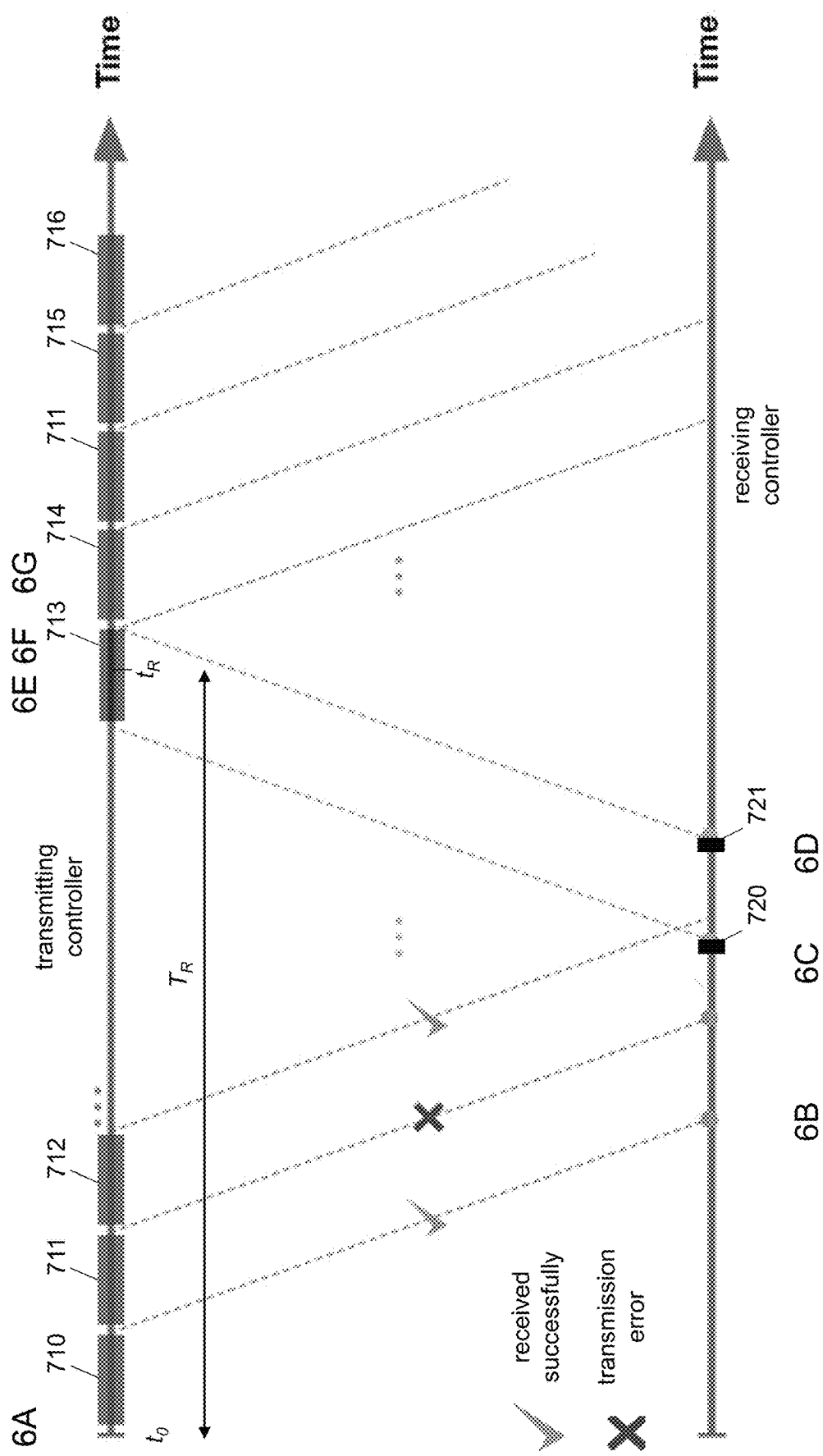
FIG. 7 illustrates an example of timing flow for transmitted and feedback frames during communications between the free-space optical communication terminals of FIGS. 1A and 1B.

FIG. 6A through FIG. 6G and FIG. 7 depict example data transmission and reception by the transmitting communication terminal 100 of FIG. 1A and receiving communication terminal 101 of FIG. 1B. FIG. 6A through FIG. 6G depicts how data blocks can be tracked using values in the slot buffer 310. FIG. 7 illustrates aspects of timing associated with transmissions.

For data transmission, the ARQ controller 120 can write values (e.g., binary values) into the state buffer 320 (also having a length of K entries) that reflect the transmission status of the data blocks 410 identified in corresponding entries of the slot buffer 310. At time $t_0$, before transmission begins, the state buffer 320 may include at least one entry (e.g., 0, though other values may be used) for each data block to indicate that the data block has not been received successfully by a receiving communication terminal 101. An example slot buffer 310 and state buffer 320 prior to data transmission is shown in FIG. 6A.

When an optical link is established between the transmitting communication terminal 100 and the receiving communication terminal 101, transmission of data blocks 410 can begin. The transmitting ARQ controller 120 begins cycling through the slot buffer 310 (indicated by the arrow in FIG. 6A) and retrieving the data blocks identified by entries (ID1, ID2, . . . ) in the slot buffer. As each data block is retrieved, the ARQ prepares a data frame 500, 501 containing the data block (or sub-block portion thereof) and transmits the data frame. The data frames are transmitted in rapid succession with little or no delay between transmission of the frames. For example the delay between transmission of data frames may be $\frac{1}{10}^{th}$ or less the amount of time it takes to transmit a data frame. Preferably, the delay between transmission of the frames is less than $\frac{1}{1000}^{th}$ the amount of time it takes to transmit a data frame. The transmission process continues as the ARQ controller 120 cycles through all entries in the slot buffer 310 in round robin manner.

FIG. 7 illustrates an example of timing of data frame transmission and low-data-rate feedback signaling that can be implemented with the automatic repeat request (ARQ)

transmission protocol. In FIG. 7, each shaded rectangle on the transmitting controller timeline represents a corresponding transmission interval 710, 711, 712, . . . , or 716 for retrieval, preparation, and transmission of a data frame 500, 501. As the ARQ controller 120 accesses the first entry in the slot buffer 310, the data block identified as ID1 in the example is retrieved and prepared in a data frame 500, 501 for transmission to the receiving communication terminal 101. The data frame is transmitted during a first transmission interval 710. Subsequent data frames are transmitted during subsequent transmission intervals 711, 712 as data blocks are retrieved by the ARQ controller 120 according to the entries in the slot buffer 310.

The receiving ARQ controller 122 can prepare and maintain a receiving state buffer 322, shown in FIG. 6B, that indicates the status of received data blocks 410 (or sub-block portions of data blocks). The receiving state buffer 322 can have a same length K as the transmitting state buffer 320. Each entry in the receiving state buffer 322 can comprise one or more bits that indicate the status of a received data payload in a received data frame 500, 501. In FIG. 6B, no data frames have yet been received and the status indicators are all "0" bits for this example.

As a data frame is received, the receiving ARQ controller 122 can check the integrity of the received data (e.g., by performing a CRC algorithm and comparing the result with the CRC error check value 510 received in the data frame). If the data is correctly received (has not been corrupted during transmission), then the receiving controller 122 can update the corresponding entry in its state buffer 322 with a different data value, as indicated in FIG. 6C. If the data was corrupted during transmission, then the receiving controller 122 may not change the value of the entry in its state buffer 322. The receiving ARQ controller can cycle through its state buffer 322 in round robin manner also, stepping to the next entry after receipt and processing of a data frame and updating the current entry of the state buffer 322.

The receiving ARQ controller 122 can transmit the receiving state buffer 322 (a feedback message) in a small data frame over the uplink to the transmitting communication terminal. Because the receiving state buffer 322 can be small in size (e.g., K bits), the return or uplink transmitting intervals 720, 721 (indicated on the receiving controller timeline in FIG. 7) can use a small amount of time in comparison the downlink transmitting intervals 710, 711 and yield a significantly lower data rate in the uplink 105 compared to the downlink 103, as described above.

A copy of the updated receiving state buffer 322 can be transmitted in an uplink data frame according to at least two methods. In a first method, updated copies of the receiving state buffer 322 can be transmitted after processing each received data frame 500, 502 and updating each entry in the state buffer 322. In a second method, a copy of the receiving state buffer 322 can be transmitted after processing the $K^{th}$ data block 410 received from the transmitting communication terminal 100 and updating the $K^{th}$ entry in the state buffer 322. In this second method, the uplink transmission of the state buffer 322 occurs once for each round-robin cycle of the slot buffer 310 by the ARQ controller, resulting in a significantly lower uplink data rate than the first method. However, the second method may incur a null downlink transmission time between each round-robin cycle of the slot buffer 310 to allow for receipt and processing of the feedback information before cycling back through the slot buffer. In the first method, the transmission intervals 710, 711, . . . 716 may continue at evenly-spaced start times throughout cycling of the slot buffer 310.

The ARQ controller 120 can receive the data from the state buffer 322 produced by the receiving ARQ controller 122 and transmitted in a feedback data frame over the uplink 105 and determine from this feedback information whether any payload data of the transmitted frames 500, 501 are requested to be retransmitted. For example, the transmitting ARQ controller 120 can perform a bitwise comparison of its current state buffer 320 with the received state buffer 322 to determine whether the corresponding entries differ or are the same. For the illustrated example, a difference in entries would mean that the data block (or sub-block portion thereof) was successfully received. A same value in corresponding entries of the two buffers can indicate that the data block was not received successfully, indicating that the corresponding data block is requested to be retransmitted.

Because the amount of data in the uplink 105 and the data rate can both be orders of magnitude lower than the amount of data transferred and the data rate of the downlink 103, the data transmitted in the uplink can be received (mostly) without error. Further, the uplink 105 may have an optical beam at higher power than the downlink optical beam since a ground-based transmitter is not as constrained by power limitations as a satellite. Nevertheless, FEC, CRCs, and repeat requests can be employed for uplink 105 transmissions. For example, a CRC value for the data of the state buffer 322 can be included in an uplink transmission frame and checked by the ARQ controller 120.

When the ARQ controller 120 determines from the received state buffer information that the data payload 560 in a data frame was received correctly, the ARQ controller may or may not update the corresponding entry in the state buffer 320 to reflect successful reception (e.g., write a 1 or other value to replace the 0 value as depicted in FIG. 6E). Any indication of successful transmission of the data can allow the ARQ controller 120 to write new identifiers (e.g., IDK+1, IDK+2) in the slot buffer 310, as depicted in FIG. 6F, to replace identifiers of data blocks that have been successfully received by the receiving communication terminal 101. After a new identifier is entered in the slot buffer, the corresponding entry in the state buffer 320 can be reset. When the ARQ controller 120 cycles again through the slot buffer, as depicted by the arrow in FIG. 6F, it can retrieve and prepare new data from the buffer 110 that is identified by new identifiers for transmission.

In response to receiving a feedback message indicating unsuccessful reception of the data, the ARQ controller 120 may leave the state buffer at its current value, or it may write another value to the state buffer 320 to indicate the failed reception. When the ARQ controller 120 cycles again to the entry in the slot buffer, as depicted by the arrow in FIG. 6G, it can retrieve the data block again (since the identifier in the slot buffer 310 has not been changed) and re-transmit the data block.

For an implementation where the data of a data block 410 is divided into multiple data payloads 560 that are transmitted in multiple frames 500, 501, the ARQ controller 120 may indicate to the receiving ARQ controller 122 that the data block 410 is divided into multiple data frames. This can be done using an entry in the sub-block ID field 530 of the data frame 500, 501. For example, a zero or null value in the sub-block ID field 530 can indicate that all the data of a data block 420 is included in the data frame. A bit sequence of [0111] in the sub-block ID field 530 could be used to indicate that the data frame is a first frame (indicated by the [01] bit pair) of three frames (indicated by the [11] bit pair) that contain all the data of a data block 410. The receiving ARQ controller 122 can then process all received data frames for a data block 410 and determine (from the CRC values) whether the data was received correctly for each of the frames. If the data payload in any one of the data frames was not received correctly, then the receiving ARQ controller 122 may not change the value in the receiving state buffer 322 for the data block to indicate unsuccessful reception of the data block. If the data payloads 560 in all frames 500, 501 for the data block are received successfully, then the receiving ARQ controller can update the corresponding entry in the state buffer 322 for the data block.

In some cases, the ARQ controller 120 may further write values to a slot index buffer 305 that are used to index to corresponding values in the slot buffer 310 and state buffer 320, as depicted in FIG. 5B, such that the data in the slot buffer 310 and state buffer 320 can be accessed in a look-up table manner using the slot index value to locate corresponding entries in the table. An index value from the slot index buffer 305 may be written to one or more frames 500 as the slot index value 540 for transmission of a data block 410 or sub-block. Alternatively, the value in the slot buffer 310 for a current data block 410 or sub-block may be written in a data frame 500 as the slot index value 540, and the slot index buffer 305 may not be implemented. Once a data frame 500 is prepared, it can be sent to the transceiver(s) 130 for transmission.

The receiving communication terminal 101 can receive transmitted frames 500 over a free-space optical link 103. In some implementations, the transceiver(s) 132 can examine the frames 500, 501 and/or payloads 560 for data errors (using the CRC values, for example) and deliver non-dropped frames to the receiving ARQ controller 122 and indicate any dropped frames. In some cases, the ARQ controller 122 may examine the frames for data errors instead of the transceiver(s). The ARQ controller 122 can unpack the payloads from the frames and write data that has been received without error to a data buffer 112. The block identifier 520 and sub-block identifier 530 can be used to write the data in a suitable, intelligible order in the data buffer 112. In some cases, when all of the sub-blocks of a given data block 410 have been written to the data buffer 112, that data block 410 is deemed successfully received. When all of the data blocks 410 that constitute the one or more files in the data buffer 110 of the transmitting communication terminal 100 have been written to the data buffer 112, the file transfer is complete.

The slot buffer 310 and state buffer 320 can be of length K (an integer greater than 1) and selected manually or automatically on the fly. The length K of the slot buffer can be chosen such that a round-trip communication time is shorter than the time it takes to transmit K data blocks 410 identified in the slot buffer 310. The round-trip communication time $T_R$ can be the time it takes from start of transmission of a data block 410 to reception and interpretation of a feedback message that indicates the success or failure of reception of that data block by the receiving ARQ controller 122. FIG. 7 depicts an example of a round-trip communication time $T_R=t_R-t_0$. Because of data processing delay at the receiving communication terminal 101, the data of the receiving state buffer 322 may not be transmitted immediately after receipt of a data frame 500, 501.

In some implementations, the receiving ARQ controller 122 may maintain a slot buffer like that of the transmitting ARQ controller 120 and update its values as data blocks are received. For example, the values in the slot buffer can identify where data for a data block is to be written in the data buffer 112 of the receiving communication terminal 101. The values in the state buffer 322 may be fed back to the transmitting ARQ controller 120 individually (e.g., after processing each data frame 500, 501). Alternatively, the values in the state buffer 322 can be fed back as a vector R or array of data values that is representative of the receiving ARQ controller's state buffer. In some cases, corresponding slot value(s) may also be fed back.

The receiving ARQ controller 122 can use the optical uplink 105 to regularly communicate state values from its state buffer 322 to the transmitting ARQ controller 120 as depicted in FIG. 7. These feedback transmissions may occur synchronously or asynchronously with the reception of data blocks 410. The optical uplink 105 may not be guaranteed to achieve error-free transmission of R. In this case, an error-detecting code (e.g., CRC value) can be included in a data frame that includes R. If the transmitting ARQ controller 120 detects that a newly received R contains errors, no further actions are taken until an error-free R is received.

There are several notable features of the ARQ protocol and above-described transmitting and receiving terminals. The protocol is suitable for latency-tolerant data-downloading service such as satellite communications. The data communications can implement data buffering and burst data transmission from point A to point B. The same data buffer hardware can be used for both transmitting memory in the transmitting communication terminal 100 and receiving memory in the receiving communication terminal 101 for large-volume storage and ARQ buffer. The ARQ protocol implements a link-layer solution for reliable data transmission. The receiving communication terminal 101 can interface with physical-layer modem via standardized framing (e.g., Ethernet). the protocol is efficient for regimes of interest (where, e.g., TCP would perform poorly). The protocol uses a low-data-rate feedback channel, which can be in-band or out-of-band.

V. Pointing, Acquisition and Tracking

Figure 8A:
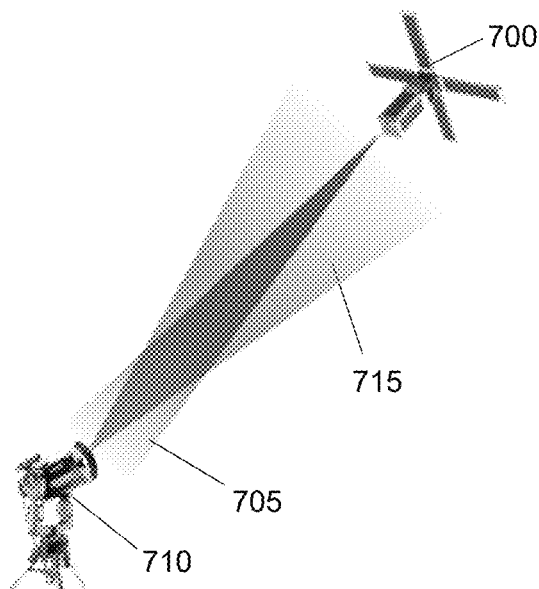
FIG. 8A illustrates optical communication links established between a ground station and a spacecraft.

FIG. 8A depicts an application for the above-described ARQ protocol and communication systems relating to communication between a spacecraft 700 (e.g., a satellite) and a ground station 710. Such applications can include accurate tracking of the ground station by the spacecraft and accurate tracking of the spacecraft by the ground station to maintain adequate optical signals on the optical downlink 103 and optical uplink 105. The optical downlink 103 can be established using a first optical beam 705 that is modulated to encode data frames and the optical uplink 105 can be established using a second optical beam 715 that is modulated to encode feedback data frames.

Figure 8B:
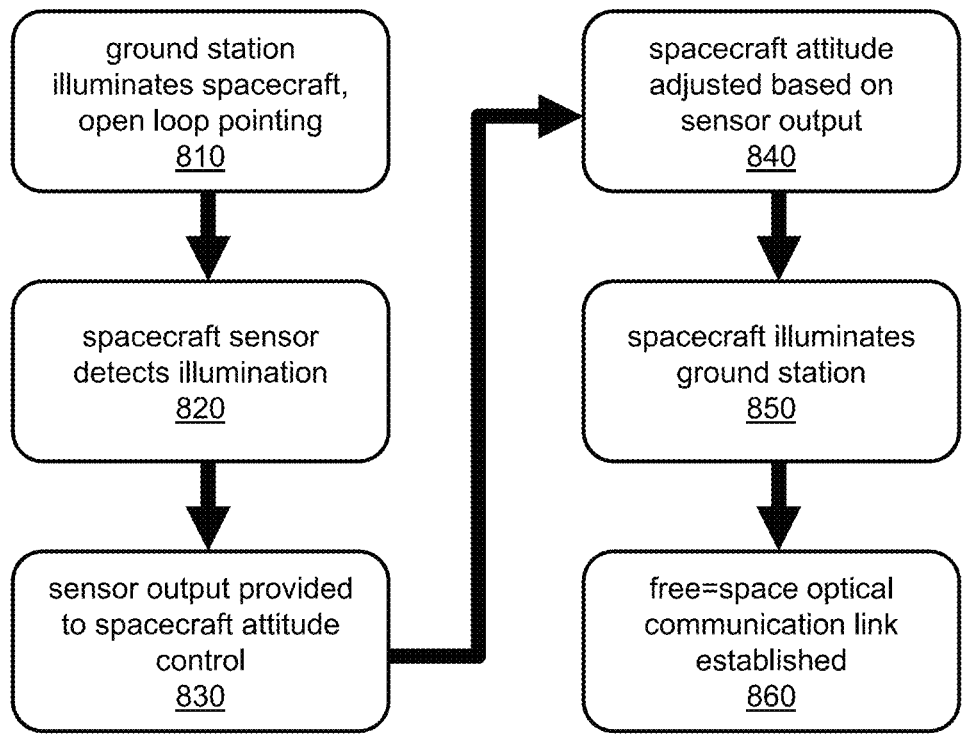
FIG. 8B depicts actions associated with pointing, acquisition, and tracking (PAT) control to establish a free-space optical communication link.

Accurate tracking of the ground station and of the satellite can implement a process referred to as pointing, acquisition and tracking (PAT). Some steps of the PAT process are depicted in FIG. 8B. The process can begin with a ground station that illuminates (act 810) a spacecraft. The ground station 710 may point a light source (e.g., a laser) at the spacecraft 700 using open-loop pointing based on prior knowledge of the spacecraft's orbit. The spacecraft 700 can include at least one sensor in its payload that detects (act 820) the illumination. Output from the sensor(s) can be provided (act 830) to the spacecraft's attitude control system. The attitude control system can adjust (act 840) the spacecraft's attitude and/or orientation of an on-board light source based, at least in part, on the sensor(s) output, so that the spacecraft can point its light source at the ground station (which can be detected as the brightest spot in the spacecraft's field of view. The spacecraft can then illuminate (act 850) the ground station. With two light beams illuminating the spacecraft 700 and ground station 710, as depicted in FIG. 8A, a free-space optical communication link can be established (act 860) between the spacecraft 700 and ground station 710.

A PAT system for free space optical communications systems may point to within a fraction of the optical beam width (at the receiver) used to establish a communication link. For example, the ground station 710 may point accurately to within a fraction of the width of its uplink optical beam 715 at the spacecraft and the spacecraft 700 may point accurately to within a fraction of the width of its downlink optical beam 705 at the ground station 710.

For an optical system, the pointing can be achieved by one or more movable mirrors or lenses in the transmitting and receiving optics 150, 152. A number of actuation strategies to move the mirror(s) and/or lens(es) can be employed. For example, electromagnetically-driven gimbals may be used for coarse pointing and piezoelectric actuators or galvanometers may be used for fast steering and fine tracking.

Figure 8C:
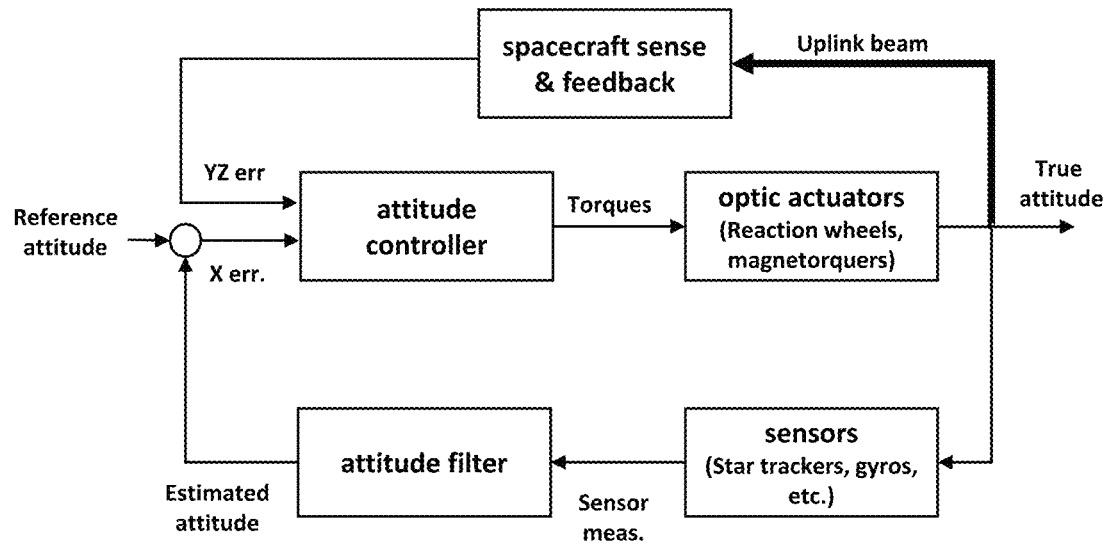
FIG. 8C illustrates an example of a PAT control architecture that may be implemented with a free-space optical communication terminal of FIG. 1A.
Figure 8D:
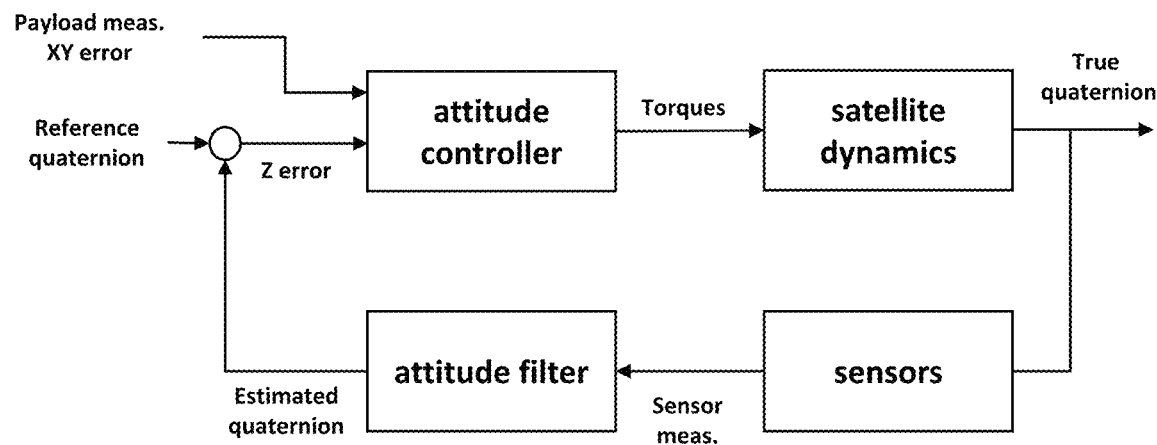
FIG. 8D illustrates an example of a PAT control architecture that may be implemented with a free-space optical communication terminal of FIG. 1A.

FIG. 8C and FIG. 8D depict PAT systems in which high pointing accuracy can be achieved by combining attitude control with feedback from an accurate sensor or sensors at the receiving device. For example, the sensor(s) used to receive an optical uplink beam 715 can also be used to provide highly accurate pointing feedback information to the ground station 710. The example control architecture depicted in FIG. 8C may be implemented at the spacecraft 700 to control the spacecraft's attitude. The example control architecture depicted in FIG. 8D may be implemented at the spacecraft 700 to control the spacecraft's quarternion. At least one sensor on the spacecraft 700 that detects the uplink beam from the ground station may comprise, for example, a quad detector than can detect an angle of arrival of the uplink beam. The detected angle may be compared to a reference angle to produce one or more error signals that are fed to the spacecraft's attitude controller. The attitude controller may actuate reaction wheels and/or magnetorquers on the spacecraft 700 to change an orientation and pointing of the spacecraft so that the communication link is improved. The reaction wheels can adjust the pointing angle of the spacecraft by exchanging momentum with the spacecraft body. The magnetorquers can adjust the pointing angle of the spacecraft by activating electromagnets that interact with the Earth's magnetic field to exert an external torque on the spacecraft.

Additionally or alternatively, other attitude sensors may be used to detect an orientation of the spacecraft 700. Examples of other attitude sensors include, but are not limited to, star trackers that match a star field image to known star patterns stored in a database, sun sensors that measure the vector to the sun, magnetometers that measure the local magnetic field, and gyroscopes that measure angular rates. An attitude filter may synthesize (e.g., weight and combine) information from multiple attitude sensors on board the spacecraft to determine, at least in part, an amount of error signal provided to the attitude controller that will control the attitude and angular rate of the spacecraft 700.

The control architectures shown in FIG. 8C and FIG. 8D may be implemented without any additional actuation systems in the transmitting and receiving optics 150, 152. The resulting PAT systems can encompass both the response of the ground station actuation systems and the error calculation within the transmitting or receiving communication terminal. These PAT systems can enable more efficient delivery of data (by reducing the number of dropped frames due to low signal strength) and may avoid potentially large size/weight/power/cost additions to the respective optical systems.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A terminal for free-space communication, the terminal comprising:
    a data buffer to store data for transmission;
    an automatic repeat request controller adapted to:
        maintain a slot buffer to store a plurality of identifiers for a plurality of data blocks, the plurality of data blocks being a portion of the data stored in the data buffer;
        cycle through the slot buffer a plurality of times;
        retrieve each data block of the plurality of data blocks from the data buffer in succession according to the plurality of identifiers in the slot buffer in response to cycling through the slot buffer;
        forward each retrieved data block for transmission to a receiving terminal;
        receive feedback information from the receiving terminal for each cycle through the slot buffer indicating whether each data block identified in the slot buffer is requested to be retransmitted or is not requested to be retransmitted;
        replace, in the slot buffer, each identifier of the plurality of identifiers with a new identifier for a new data block that is stored in the data buffer, wherein the replaced identifier is an identifier for which the feedback information indicates that a corresponding data block is not requested to be retransmitted; and
        leave unchanged, in the slot buffer, each identifier of the plurality of identifiers for which the feedback information indicates that a corresponding data block is requested to be retransmitted;
    a first optical transceiver to receive at least a portion of a first data block of the plurality of data blocks from the automatic repeat request controller and to encode the at least a portion of the first data block onto a first optical carrier wave; and
    optics to transmit the first optical carrier wave encoded with the at least the portion of the first data block to the receiving terminal via a free space optical link.

2. The terminal of claim 1, wherein a number of entries in the slot buffer is selected such that a round trip time measured from a start of forwarding for transmission a first data block of the retrieved each data block to receiving the feedback information indicating whether or not the first data block is requested to be retransmitted is less than an amount of time taken to transmit all data blocks identified in the slot buffer for one cycle through the slot buffer.

3. The terminal of claim 1, wherein the automatic repeat request controller is further adapted to automatically select the size of the data blocks based on average time scale of power fluctuations in the free space optical link, average duration over which data is received correctly over the optical link, average duration of signal drop-outs in the optical link, or some combination of these factors.

4. The terminal of claim 1, wherein the first optical transceiver is configured for a fiber-optic communication protocol.

5. The terminal of claim 4, further comprising:
    a second optical transceiver to receive at least a portion of a second data block of the plurality of data blocks from the automatic repeat request controller and to encode the at least a portion of the second data block onto a second optical carrier wave having a wavelength different that the first optical carrier wave, wherein the optics expand and collimate the first optical carrier wave and the second optical carrier wave.

6. The terminal of claim 5, further comprising a wavelength-division multiplexor to receive the first optical carrier wave and the second optical carrier wave and multiples the first optical carrier wave and second optical carrier wave onto a common optical path.

7. The terminal of claim 1, wherein the buffer is sized to store at least 1 gigabyte of data.

8. A terminal for free-space communication, the terminal comprising:
    optics to receive from a transmitting terminal via a free-space optical link a first optical carrier wave encoding a plurality of data blocks in a communication signal;
    a first optical transceiver to receive a first optical signal from the optics and to decode from the first optical signal frames of data each containing payload data, wherein a data block of the plurality of data blocks comprises the payload data from at least one of the data frames;

a data buffer to store the payload data that are decoded without error from the first optical signal; and an automatic repeat request controller adapted to:
maintain a state buffer having a plurality of entries corresponding to the plurality of data blocks;
receive the frames of data from the first optical transceiver;
extract from a first frame of the frames of data a first identifier for a first data block of the plurality of data blocks, wherein the first data block comprises first data from at least the payload data from the first frame;
determine that the first data block is received correctly if the first data is decoded without error;
determine that the first data block is received incorrectly if the first data is decoded with error;
forward to the data buffer the first data if it is determined that the first data block is received correctly;
provide in a first entry of the state buffer, corresponding to a first data block of the plurality of data blocks, a first value indicating that the first data block should be retransmitted if it is determined that the first data block is received incorrectly;
provide in the first entry of the state buffer, corresponding to the first data block of the plurality of data blocks, a second value indicating that the first data block should not be retransmitted if it is determined that the first data block is received correctly;
prepare feedback information based on the plurality of entries in the state buffer; and
forward the feedback information for transmission to the transmitting terminal.

9. The terminal of claim 8, wherein the optics include an adaptive optics assembly to receive the first optical carrier wave, reduce wavefront distortions on the first optical carrier wave, and forward the first optical carrier wave to the first optical transceiver.

10. The terminal of claim 9, further comprising:
an optical fiber to guide the first optical carrier wave to the first optical transceiver.

11. The terminal of claim 8, wherein the data buffer is sized to store at least 5 gigabytes of data.

12. The terminal of claim 8, further comprising:
a second optical transceiver to receive a second optical signal from the optics; and
a wavelength-division multiplexor to receive the first optical signal and the second optical signal from a same optical signal path, separate the first optical signal and the second optical signal onto two different optical signal paths, and provide the first optical signal to the first optical transceiver and the second optical signal to the second optical transceiver.

13. A method of free-space optical communication, the method comprising:
writing, by an automatic repeat request controller, first entries in a slot buffer to identify a plurality of data blocks stored in a data buffer;
cycling through the slot buffer a first time, by the automatic repeat request controller;
retrieving in succession the plurality of data blocks from the data buffer that are identified by the first entries in the slot buffer;
forwarding in succession, by the automatic repeat request controller, the plurality of data blocks to a first optical transceiver for transmission to a receiving terminal;
indicating, by the automatic repeat request controller, with second entries of a state buffer transmission status of each data block of the plurality of data blocks;
receiving, by the automatic repeat request controller from the receiving terminal, a feedback message containing a plurality of values that each indicate whether each data block of the plurality of data blocks is to be retransmitted to the receiving terminal or is not to be retransmitted to the receiving terminal;
comparing, by the automatic repeat request controller, the plurality of values from the feedback message with the second entries in the state buffer;
changing, by the automatic repeat request controller, a first entry of the first entries in the slot buffer to a new entry that identifies a new data block stored in the data buffer in response to the comparing indicating that a first data block of the plurality of data blocks identified by the first entry is not to be retransmitted to the receiving terminal;
leaving unchanged, by the automatic repeat request controller, a second entry of the first entries in the slot buffer in response to the comparing indicating that a second data block of the plurality of data blocks is to be retransmitted to the receiving terminal;
cycling through the slot buffer a second time in a round-robin protocol;
forwarding again, by the automatic repeat request controller, the second data block to the first optical transceiver for re-transmission to the receiving terminal;
encoding, by the first optical transceiver, data for each data block of the plurality of data blocks received from the automatic repeat request controller onto an optical carrier wave; and
transmitting the optical carrier wave to the receiving terminal via a free-space optical link.

14. The method of claim 13, wherein retrieving a data block of the plurality of data blocks by the automatic repeat request controller comprises:
receiving portions of the data block in parallel from a plurality of memory devices in the data buffer.

15. The method of claim 13, wherein the comparing comprises:
performing a bit-wise comparison of each value from the feedback message with each corresponding second entry of the second entries in the state buffer, wherein each value consists of a single bit and each corresponding second entry consists of a single bit.

16. The method of claim 13, further comprising:
transmitting, by the first optical receiver, the data for each data block at a data rate of at least 100 gigabits per second; and
receiving the feedback message from the receiving terminal over an optical uplink having a data rate of less than 10 kilobits per second.

17. The method of claim 13, further comprising selecting the total number of first entries in the slot buffer such that it takes longer to cycle once through the slot buffer than for the automatic repeat request controller to forward the first data block of the plurality of data blocks for transmission and receive a feedback message identifying the first data block is to be retransmitted or is not to be retransmitted.

18. A method of free-space optical communication, the method comprising:

receiving, by an optical assembly, an optical communication signal over a free-space optical link from a transmitting terminal, wherein the optical signal encodes a plurality of data blocks;

providing, by the optical assembly, a first optical signal to a first optical transceiver;

decoding, by the first optical transceiver, frames of data from the first optical signal, each frame of data containing payload data, wherein a data block of the plurality of data blocks comprises the payload data from at least one of the data frames;

receiving, by an automatic repeat request controller, the frames of data from the first optical transceiver;

maintaining, by the automatic repeat request controller, a state buffer having a plurality of entries corresponding to the plurality of data blocks;

extracting, by the automatic repeat request controller, from a first frame of the frames of data a first identifier for a first data block of the plurality of data blocks, wherein the first data block comprises first data from at least the payload data from the first frame;

determining, by the automatic repeat request controller, that the first data block is received correctly if the first data is decoded without error;

determining, by the automatic repeat request controller, that the first data block is received incorrectly if the first data is decoded with error;

forwarding to a data buffer, by the automatic repeat request controller, the first data if it is determined that the first data block is received correctly;

providing, by the automatic repeat request controller, in a first entry of the state buffer, corresponding to a first data block of the plurality of data blocks, a first value indicating that the first data block should be retransmitted if it is determined that the first data block is received incorrectly;

providing, by the automatic repeat request controller, in the first entry of the state buffer, corresponding to the first data block of the plurality of data blocks, a second value indicating that the first data block should not be retransmitted if it is determined that the first data block is received correctly;

preparing, by the automatic repeat request controller, feedback information based on the plurality of entries in the state buffer; and forwarding, by the automatic repeat request controller, the feedback information for transmission to the transmitting terminal.

19. The method of claim 18, wherein receiving the optical communication signal comprises reducing wavefront distortion in the optical communication signal with an adaptive optic.

20. The method of claim 18, wherein a data rate of the first optical signal is at least 50 gigabits per second and the method further comprises sending the feedback information over an optical uplink to the transmitting terminal at a data rate less than 10 kilobits per second.

* * * * *